(12) United States Patent
Karabinis et al.

(10) Patent No.: US 7,437,123 B2
(45) Date of Patent: Oct. 14, 2008

(54) SPACE-BASED NETWORK ARCHITECTURES FOR SATELLITE RADIOTELEPHONE SYSTEMS

(75) Inventors: Peter D. Karabinis, Cary, NC (US); Carson E. Agnew, Vienna, VA (US)

(73) Assignee: ATC Technologies, LLC, Reston, VA (US)

( * ) Notice: Subject to any disclaimer, the term of this patent is extended or adjusted under 35 U.S.C. 154(b) by 0 days.

(21) Appl. No.: 11/241,519

(22) Filed: Sep. 30, 2005

(65) Prior Publication Data

US 2006/0040657 A1    Feb. 23, 2006

Related U.S. Application Data

(63) Continuation of application No. 10/225,623, filed on Aug. 22, 2002, now Pat. No. 7,006,789, and a continuation-in-part of application No. 10/074,097, filed on Feb. 12, 2002, now Pat. No. 6,684,057.

(60) Provisional application No. 60/392,771, filed on Jul. 1, 2002, provisional application No. 60/322,240, filed on Sep. 14, 2001.

(51) Int. Cl.
H04B 7/185 (2006.01)
(52) U.S. Cl. .................. 455/12.1; 455/427; 370/316
(58) Field of Classification Search ....... 455/12.1–13.4, 455/427–430, 63.1, 67.13, 114.2; 370/316
See application file for complete search history.

(56) References Cited

U.S. PATENT DOCUMENTS

| | | | |
|---|---|---|---|
| 4,901,307 A | 2/1990 | Gilhousen et al. | |
| 5,073,900 A | 12/1991 | Mallinckrodt | |
| 5,303,286 A | 4/1994 | Wiedeman | |
| 5,339,330 A | 8/1994 | Mallinckrodt | |
| 5,394,561 A | 2/1995 | Freeburg | |
| 5,446,756 A | 8/1995 | Mallinckrodt | |
| 5,448,623 A | 9/1995 | Wiedeman et al. | |
| 5,511,233 A | 4/1996 | Otten | |
| 5,555,257 A | 9/1996 | Dent | |
| 5,584,046 A | 12/1996 | Martinez et al. | |

(Continued)

FOREIGN PATENT DOCUMENTS

| | | |
|---|---|---|
| EP | 0 506 255 A2 | 9/1992 |
| EP | 0 597 225 A1 | 5/1994 |
| EP | 0 506 255 B1 | 11/1996 |
| EP | 0 748 065 A2 | 12/1996 |
| EP | 0 755 163 A2 | 1/1997 |

(Continued)

OTHER PUBLICATIONS

International Search Report, PCT/US02/26946, Mar. 31, 2003.

(Continued)

*Primary Examiner*—Edward Urban
*Assistant Examiner*—Raymond S Dean
(74) *Attorney, Agent, or Firm*—Myers Bigel Sibley & Sajovec, P.A.

(57) ABSTRACT

A space-based network for a satellite radiotelephone system includes at least one receive-only satellite and at least one transmit satellite. The transmit satellite can be a transmit-only satellite or a transmit and receive satellite. The receive-only satellite(s) are configured to receive wireless communications from a radiotelephone at a location over a satellite frequency band. The transmit satellite(s) are configured to transmit wireless communications to the radiotelephone at the location over the satellite frequency band. By providing at least one receive-only satellite and at least one transmit satellite, space-based networks can offer a significant link margin, without the need to undesirably burden the radiotelephones themselves to achieve this link margin.

78 Claims, 12 Drawing Sheets

U.S. PATENT DOCUMENTS

| | | | |
|---|---|---|---|
| 5,612,703 A | 3/1997 | Mallinckrodt | |
| 5,619,525 A | 4/1997 | Wiedeman et al. | |
| 5,631,898 A | 5/1997 | Dent | |
| 5,761,605 A | 6/1998 | Tawil et al. | |
| 5,765,098 A | 6/1998 | Bella | |
| 5,812,947 A | 9/1998 | Dent | |
| 5,832,379 A | 11/1998 | Mallinckrodt | |
| 5,835,857 A | 11/1998 | Otten | |
| 5,848,060 A | 12/1998 | Dent | |
| 5,852,721 A | 12/1998 | Dillon et al. | |
| 5,878,329 A | 3/1999 | Mallinckrodt | |
| 5,884,142 A | 3/1999 | Wiedeman et al. | |
| 5,907,541 A | 5/1999 | Fairholm et al. | |
| 5,926,758 A | 7/1999 | Grybos et al. | |
| 5,937,332 A | 8/1999 | Karabinis | |
| 5,940,753 A | 8/1999 | Mallinckrodt | |
| 5,991,345 A | 11/1999 | Ramasastry | |
| 5,995,832 A | 11/1999 | Mallinckrodt | |
| 6,011,951 A | 1/2000 | King et al. | |
| 6,023,605 A | 2/2000 | Sasaki et al. | |
| 6,052,560 A | 4/2000 | Karabinis | |
| 6,052,586 A | 4/2000 | Karabinis | |
| 6,064,859 A * | 5/2000 | Leopold et al. | 455/13.1 |
| 6,067,442 A | 5/2000 | Wiedeman et al. | |
| 6,072,430 A | 6/2000 | Wyrwas et al. | |
| 6,085,094 A | 7/2000 | Vasudevan et al. | |
| 6,091,933 A | 7/2000 | Sherman et al. | |
| 6,097,752 A | 8/2000 | Wiedeman et al. | |
| 6,101,385 A | 8/2000 | Monte et al. | |
| 6,108,561 A | 8/2000 | Mallinckrodt | |
| 6,134,437 A | 10/2000 | Karabinis et al. | |
| 6,157,811 A | 12/2000 | Dent | |
| 6,157,834 A | 12/2000 | Helm et al. | |
| 6,160,994 A | 12/2000 | Wiedeman | |
| 6,169,878 B1 | 1/2001 | Tawil et al. | |
| 6,198,730 B1 | 3/2001 | Hogberg et al. | |
| 6,198,921 B1 | 3/2001 | Youssefzadeh et al. | |
| 6,201,967 B1 | 3/2001 | Goerke | |
| 6,226,493 B1 * | 5/2001 | Leopold et al. | 455/13.1 |
| 6,233,463 B1 | 5/2001 | Wiedeman et al. | |
| 6,240,124 B1 | 5/2001 | Wiedeman et al. | |
| 6,253,080 B1 | 6/2001 | Wiedeman et al. | |
| 6,256,497 B1 | 7/2001 | Chambers | |
| 6,301,476 B1 * | 10/2001 | Monte et al. | 455/427 |
| 6,317,420 B1 * | 11/2001 | Schiff | 370/325 |
| 6,324,405 B1 | 11/2001 | Young et al. | |
| 6,339,707 B1 | 1/2002 | Wainfan et al. | |
| 6,418,147 B1 | 7/2002 | Wiedeman | |
| 6,424,831 B1 | 7/2002 | Schiff | |
| 6,449,461 B1 | 9/2002 | Otten | |
| 6,522,865 B1 | 2/2003 | Otten | |
| 6,526,278 B1 * | 2/2003 | Hanson et al. | 455/427 |
| 6,628,919 B1 | 9/2003 | Curello et al. | |
| 6,675,013 B1 * | 1/2004 | Gross et al. | 455/431 |
| 6,684,057 B2 | 1/2004 | Karabinis | |
| 6,735,437 B2 * | 5/2004 | Mayfield et al. | 455/427 |
| 6,775,251 B1 | 8/2004 | Wiedeman | |
| 6,785,543 B2 | 8/2004 | Karabinis | |
| 6,856,787 B2 | 2/2005 | Karabinis | |
| 6,859,652 B2 | 2/2005 | Karabinis et al. | |
| 6,879,829 B2 | 4/2005 | Dutta et al. | |
| 6,892,068 B2 | 5/2005 | Karabinis et al. | |
| 6,937,857 B2 | 8/2005 | Karabinis | |
| 6,975,837 B1 | 12/2005 | Santoru | |
| 6,999,720 B2 | 2/2006 | Karabinis | |
| 7,006,789 B2 * | 2/2006 | Karabinis et al. | 455/12.1 |
| 2001/0046841 A1 * | 11/2001 | Hart et al. | 455/12.1 |
| 2002/0122408 A1 | 9/2002 | Mullins | |
| 2002/0146979 A1 | 10/2002 | Regulinski et al. | |
| 2002/0177465 A1 | 11/2002 | Robinett | |
| 2003/0003815 A1 | 1/2003 | Yamada | |
| 2003/0022625 A1 | 1/2003 | Otten et al. | |
| 2003/0054762 A1 | 3/2003 | Karabinis | |
| 2003/0054814 A1 | 3/2003 | Karabinis et al. | |
| 2003/0054815 A1 | 3/2003 | Karabinis | |
| 2003/0068978 A1 | 4/2003 | Karabinis et al. | |
| 2003/0073436 A1 | 4/2003 | Karabinis et al. | |
| 2003/0149986 A1 | 8/2003 | Mayfield et al. | |
| 2003/0153308 A1 | 8/2003 | Karabinis | |
| 2004/0072539 A1 | 4/2004 | Monte et al. | |
| 2004/0102156 A1 | 5/2004 | Loner | |
| 2004/0121727 A1 | 6/2004 | Karabinis | |
| 2004/0142660 A1 | 7/2004 | Churan | |
| 2004/0192200 A1 | 9/2004 | Karabinis | |
| 2004/0192293 A1 | 9/2004 | Karabinis | |
| 2004/0192395 A1 | 9/2004 | Karabinis | |
| 2004/0203393 A1 | 10/2004 | Chen | |
| 2004/0203742 A1 | 10/2004 | Karabinis | |
| 2004/0240525 A1 | 12/2004 | Karabinis et al. | |
| 2005/0026606 A1 | 2/2005 | Karabinis | |
| 2005/0037749 A1 | 2/2005 | Karabinis et al. | |
| 2005/0041619 A1 | 2/2005 | Karabinis et al. | |
| 2005/0064813 A1 | 3/2005 | Karabinis | |
| 2005/0079816 A1 | 4/2005 | Singh et al. | |
| 2005/0090256 A1 | 4/2005 | Dutta | |
| 2005/0118948 A1 | 6/2005 | Karabinis et al. | |
| 2005/0136836 A1 | 6/2005 | Karabinis et al. | |
| 2005/0164700 A1 | 7/2005 | Karabinis | |
| 2005/0164701 A1 | 7/2005 | Karabinis et al. | |
| 2005/0170834 A1 | 8/2005 | Dutta et al. | |
| 2005/0181786 A1 | 8/2005 | Karabinis et al. | |
| 2005/0201449 A1 | 9/2005 | Churan | |
| 2005/0208890 A1 | 9/2005 | Karabinis | |
| 2005/0221757 A1 | 10/2005 | Karabinis | |
| 2005/0227618 A1 | 10/2005 | Karabinis et al. | |
| 2005/0239399 A1 | 10/2005 | Karabinis | |
| 2005/0239403 A1 | 10/2005 | Karabinis | |
| 2005/0239404 A1 | 10/2005 | Karabinis | |
| 2005/0239457 A1 | 10/2005 | Levin et al. | |
| 2005/0245192 A1 | 11/2005 | Karabinis | |
| 2005/0260947 A1 | 11/2005 | Karabinis et al. | |
| 2005/0260984 A1 | 11/2005 | Karabinis | |
| 2005/0265273 A1 | 12/2005 | Karabinis et al. | |
| 2005/0272369 A1 | 12/2005 | Karabinis et al. | |
| 2005/0282542 A1 | 12/2005 | Karabinis | |
| 2005/0288011 A1 | 12/2005 | Dutta | |
| 2006/0040659 A1 | 2/2006 | Karabinis | |

FOREIGN PATENT DOCUMENTS

| | | |
|---|---|---|
| EP | 0 762 669 A2 | 3/1997 |
| EP | 0 762 669 A3 | 3/1997 |
| EP | 0 797 319 A2 | 9/1997 |
| EP | 0 831 599 A2 | 3/1998 |
| EP | 0 831 599 A3 | 3/1998 |
| EP | 1 059 826 A1 | 12/2000 |
| EP | 1 193 989 A1 | 4/2002 |
| GB | 2 326 061 A | 12/1988 |
| JP | 62-18841 A | 1/1987 |
| WO | WO 01/54314 A1 | 7/2001 |

OTHER PUBLICATIONS

Global.com, "Globalstar Demonstrates World's First Prototype of Terrestrial System to Supplemental Satellite Phones," http://www.globalcomsatphone.com/globalcom/globalstar_terrestrial_system.html, Jul. 18, 2002, 2 pages.

Ayyagari et al., "A satellite-augmented cellular network concept", *Wireless Networks*, Vo. 4, 1998, pp. 189-198.

Supplementary European Search Report, EP 02763512.7, Oct. 27, 2007.

* cited by examiner

SPACE-BASED NETWORK ARCHITECTURES FOR SATELLITE RADIOTELEPHONE SYSTEMS

CROSS-REFERENCE TO RELATED APPLICATIONS

This application is a continuation of U.S. patent application Ser. No. 10/225,623, filed Aug. 22, 2002, now U.S. Pat. No. 7,006,789, entitled *Space-Based Network Architectures for Satellite Radiotelephone Systems*, which claims the benefit of provisional Application No. 60/322,240, filed Sep. 14, 2001, entitled *Systems and Methods for Terrestrial Re-Use of Mobile Satellite Spectrum* and provisional Application No. 60/392,771, filed Jul. 1, 2002, entitled *Space-Based Network Architectures for Satellite Radiotelephone Systems*, all of which are assigned to the assignee of the present application, the disclosures of all of which are hereby incorporated herein by reference in their entirety as if set forth fully herein. This application also is a continuation-in-part (CIP) of application Ser. No. 10/074,097, filed Feb. 12, 2002, now U.S. Pat. No. 6,684,057 entitled *Systems and Methods for Terrestrial Reuse of Cellular Satellite Frequency Spectrum*, assigned to the assignee of the present application, the disclosure of which is hereby incorporated herein by reference in its entirety as if set forth fully herein.

FIELD OF THE INVENTION

This invention relates to radiotelephone communications systems and methods, and more particularly to terrestrial cellular and satellite cellular radiotelephone communications systems and methods.

BACKGROUND OF THE INVENTION

Satellite radiotelephone communications systems and methods are widely used for radiotelephone communications. Satellite radiotelephone communications systems and methods generally employ at least one space-based component, such as one or more satellites that are configured to wirelessly communicate with a plurality of satellite radiotelephones.

A satellite radiotelephone communications system or method may utilize a single antenna beam covering an entire area served by the system. Alternatively, in cellular satellite radiotelephone communications systems and methods, multiple beams are provided, each of which can serve distinct geographical areas in the overall service region, to collectively serve an overall satellite footprint. Thus, a cellular architecture similar to that used in conventional terrestrial cellular radiotelephone systems and methods can be implemented in cellular satellite-based systems and methods. The satellite typically communicates with radiotelephones over a bidirectional communications pathway, with radiotelephone communication signals being communicated from the satellite to the radiotelephone over a downlink or forward link, and from the radiotelephone to the satellite over an uplink or return link.

The overall design and operation of cellular satellite radiotelephone systems and methods are well known to those having skill in the art, and need not be described further herein. Moreover, as used herein, the term "radiotelephone" includes cellular and/or satellite radiotelephones with or without a multi-line display; Personal Communications System (PCS) terminals that may combine a radiotelephone with data processing, facsimile and/or data communications capabilities; Personal Digital Assistants (PDA) that can include a radio frequency transceiver and a pager, Internet/intranet access, Web browser, organizer, calendar and/or a global positioning system (GPS) receiver; and/or conventional laptop and/or palmtop computers or other appliances, which include a radio frequency transceiver.

As is well known to those having skill in the art, terrestrial networks can enhance cellular satellite radiotelephone system availability, efficiency and/or economic viability by terrestrially reusing at least some of the frequency bands that are allocated to cellular satellite radiotelephone systems. In particular, it is known that it may be difficult for cellular satellite radiotelephone systems to reliably serve densely populated areas, because the satellite signal may be blocked by high-rise structures and/or may not penetrate into buildings. As a result, the satellite spectrum may be underutilized or unutilized in such areas. The use of terrestrial retransmission can reduce or eliminate this problem.

Moreover, the capacity of the overall system can be increased significantly by the introduction of terrestrial retransmission, since terrestrial frequency reuse can be much denser than that of a satellite-only system. In fact, capacity can be enhanced where it may be mostly needed, i.e., densely populated urban/industrial/commercial areas. As a result, the overall system can become much more economically viable, as it may be able to serve a much larger subscriber base. Finally, satellite radiotelephones for a satellite radiotelephone system having a terrestrial component within the same satellite frequency band and using substantially the same air interface for both terrestrial and satellite communications can be more cost effective and/or aesthetically appealing. Conventional dual band/dual mode alternatives, such as the well known Thuraya, Iridium and/or Globalstar dual mode satellite/terrestrial radiotelephone systems, may duplicate some components, which may lead to increased cost, size and/or weight of the radiotelephone.

One example of terrestrial reuse of satellite frequencies is described in U.S. Pat. No. 5,937,332 to the present inventor Karabinis entitled *Satellite Telecommunications Repeaters and Retransmission Methods*, the disclosure of which is hereby incorporated herein by reference in its entirety as if set forth fully herein. As described therein, satellite telecommunications repeaters are provided which receive, amplify, and locally retransmit the downlink signal received from a satellite thereby increasing the effective downlink margin in the vicinity of the satellite telecommunications repeaters and allowing an increase in the penetration of uplink and downlink signals into buildings, foliage, transportation vehicles, and other objects which can reduce link margin. Both portable and non-portable repeaters are provided. See the abstract of U.S. Pat. No. 5,937,332.

In view of the above discussion, there continues to be a need for systems and methods for terrestrial reuse of cellular satellite frequencies that can allow improved reliability, capacity, cost effectiveness and/or aesthetic appeal for cellular satellite radiotelephone systems, methods and/or satellite radiotelephones.

SUMMARY OF THE INVENTION

Some embodiments of the present invention provide a space-based network for a satellite radiotelephone system that includes at least one receive-only satellite and at least one transmit satellite. In some embodiments, the transmit satellite is a transmit-only satellite, whereas in other embodiments, the transmit satellite is a transmit and receive satellite. The at least one receive-only satellite is configured to receive wireless communications from a radiotelephone at a predetermined location over a satellite frequency band. The at least one transmit satellite is configured to transmit wireless communications to the radiotelephone at the predetermined location over the satellite frequency band. By providing at least one receive-only satellite and at least one transmit satellite, space-based networks according to some embodiments of the present invention can offer a significant link margin, without the need to undesirably burden the radiotelephones themselves to achieve this link margin.

Accordingly, some embodiments of the invention provide a space-based network for a satellite radiotelephone system that comprises more receive satellites than transmit satellites. Other embodiments of the invention provide a space-based network for a satellite radiotelephone system comprising a plurality of satellites that collectively provide greater uplink margin than downlink margin.

In some embodiments of the invention, the at least one receive-only satellite consists of two receive-only satellites. In other embodiments, the at least one transmit satellite comprises at least one transmit-only satellite. In other embodiments, the at least one transmit-only satellite consists of a single transmit-only satellite. In some embodiments, one of the two receive-only satellites and a single transmit-only satellite are collocated in an orbital slot.

In some embodiments, each of the receive-only satellites comprises first and second receive antennas. In other embodiments, the first and second receive-only antennas are about 24 meters in diameter.

In other embodiments, the at least one transmit satellite comprises at least one transmit and receive satellite. In other embodiments, the at least one transmit and receive satellite consists of a single transmit and receive satellite that is collocated in an orbital slot with one of the two receive-only satellites. In other embodiments, the at least one transmit and receive satellite consists of two transmit and receive satellites, a respective one of which is collocated in an orbital slot with a respective one of the two receive-only satellites.

In some embodiments, the single transmit and receive satellite includes a single transmit antenna and a single receive antenna. In other embodiments, the single transmit and receive satellite comprises a single transmit and receive antenna and a single receive antenna. In yet other embodiments, the two transmit and receive satellites each comprises a single transmit antenna and a single receive antenna. In still other embodiments, the two transmit and receive satellite antennas each comprises a single transmit and receive antenna and a single receive antenna.

In other embodiments, each of the receive-only satellites includes first through fourth processors. The first processor is configured to process wireless communications that are received by the first receive-only antenna in a first type of circular polarization. The second processor is configured to process wireless communications that are received by the first receive-only antenna in a second type of circular polarization. The third processor is configured to process wireless communications that are received by the second receive-only antenna in the first polarization, and the fourth processor is configured to process wireless communications that are received by the second receive-only antenna in the second polarization.

In other embodiments, each of the receive-only satellites includes a feeder link signal generator. The feeder link signal generator is configured to combine signals that are received by the first and second receive-only antennas into at least one feeder link signal, including a plurality of orthogonal dimensions and/or polarizations, such as in-phase and quadrature dimensions, horizontal and vertical polarizations, left hand circular and right hand circular polarizations and/or other orthogonal dimensions and/or polarizations.

Space-based networks according to other embodiments of the invention also include a gateway that is configured to receive the feeder link signal from each of the two receive-only satellites. In other embodiments, the gateway may be configured to receive the feeder link signal from each of the two receive-only satellites when the feeder link signal has a bandwidth that is at least as wide as the signals that are received by the first and second receive-only antennas of one of the receive-only satellites. In other embodiments, the space-based network includes a plurality of gateways, a respective one of which is configured to receive a feeder link signal from each of the two receive-only satellites. In some embodiments, the signals that are received by the first and/or second receive-only antennas of one of the receive-only satellites have a bandwidth that is wider than the feeder link signal.

Still other embodiments of the present invention include a combiner that is configured to combine the feeder link signals that are received at at least one of the plurality of gateways, in order to reconstruct the wireless communications from the radiotelephone. Still other embodiments of the present invention include an ancillary terrestrial network that is configured to wirelessly communicate with the radiotelephone at the predetermined location over at least some of the satellite radiotelephone frequency band, to thereby terrestrially reuse the at least some of the satellite radiotelephone frequency band.

DETAILED DESCRIPTION

The present invention now will be described more fully hereinafter with reference to the accompanying drawings, in which embodiments of the invention are shown. This invention should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
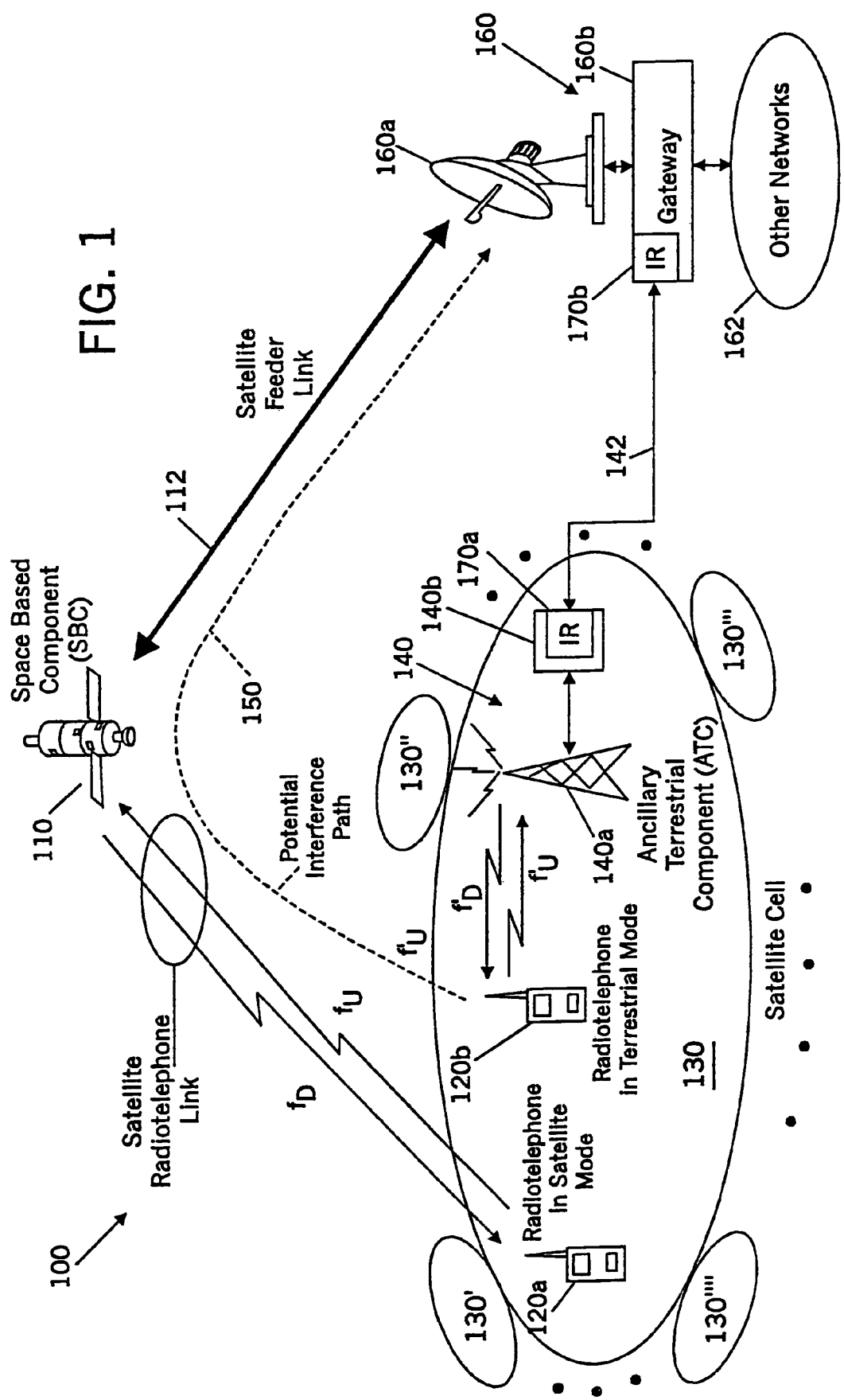
FIG. 1 is a schematic diagram of cellular radiotelephone systems and methods according to embodiments of the invention.

FIG. 1 is a schematic diagram of cellular satellite radiotelephone systems and methods according to embodiments of the invention. As shown in FIG. 1, these cellular satellite radiotelephone systems and methods 100 include at least one Space-Based Component (SBC) 110, such as a satellite. The space-based component 110 is configured to transmit wireless communications to a plurality of radiotelephones 120a, 120b in a satellite footprint comprising one or more satellite radiotelephone cells 130-130"" over one or more satellite radiotelephone forward link (downlink) frequencies $f_D$. The space-based component 110 is configured to receive wireless communications from, for example, a first radiotelephone 120a in the satellite radiotelephone cell 130 over a satellite radiotelephone return link (uplink) frequency $f_U$. An ancillary terrestrial network, comprising at least one ancillary terrestrial component 140, which may include an antenna 140a and an electronics system 140b (for example, at least one antenna 140a and at last one electronics system 140b), is configured to receive wireless communications from, for example, a second radiotelephone 120b in the radiotelephone cell 130 over the satellite radiotelephone uplink frequency, denoted $f_{U'}$, which may be the same as $f_U$. Thus, as illustrated in FIG. 1, radiotelephone 120a may be communicating with the space-based component 110 while radiotelephone 120b may be communicating with the ancillary terrestrial component 140. As shown in FIG. 1, the space-based component 110 also undesirably receives the wireless communications from the second radiotelephone 120b in the satellite radiotelephone cell 130 over the satellite radiotelephone frequency $f_{U'}$ as interference. More specifically, a potential interference path is shown at 150. In this potential interference path 150, the return link signal of the second radiotelephone 120b at carrier frequency $f_{U'}$ interferes with satellite communications. This interference would generally be strongest when $f_{U'}=f_U$, because, in that case, the same return link frequency would be used for space-based component and ancillary terrestrial component communications over the same satellite radiotelephone cell, and no spatial discrimination between satellite radiotelephone cells would appear to exist.

Still referring to FIG. 1, embodiments of satellite radiotelephone systems/methods 100 can include at least one gateway 160 that can include an antenna 160a and an electronics system 160b that can be connected to other networks 162 including terrestrial and/or other radiotelephone networks. The gateway 160 also communicates with the space-based component 110 over a satellite feeder link 112. The gateway 160 also communicates with the ancillary terrestrial component 140, generally over a terrestrial link 142.

Still referring to FIG. 1, an Interference Reducer (IR) 170a also may be provided at least partially in the ancillary terrestrial component electronics system 140b. Alternatively or additionally, an interference reducer 170b may be provided at least partially in the gateway electronics system 160b. In yet other alternatives, the interference reducer may be provided at least partially in other components of the cellular satellite system/method 100 instead of or in addition to the interference reducer 170a and/or 170b. The interference reducer is responsive to the space-based component 110 and to the ancillary terrestrial component 140, and is configured to reduce the interference from the wireless communications that are received by the space-based component 110 and is at least partially generated by the second radiotelephone 120b in the satellite radiotelephone cell 130 over the satellite radiotelephone frequency $f_U$. The interference reducer 170a and/or 170b uses the wireless communications $f_{U'}$ that are intended for the ancillary terrestrial component 140 from the second radiotelephone 120b in the satellite radiotelephone cell 130 using the satellite radiotelephone frequency $f_{U'}$ to communicate with the ancillary terrestrial component 140.

In embodiments of the invention, as shown in FIG. 1, the ancillary terrestrial component 140 generally is closer to the first and second radiotelephones 120a and 120b, respectively, than is the space-based component 110, such that the wireless communications from the second radiotelephone 120b are received by the ancillary terrestrial component 140 prior to being received by the space-based component 110. The interference reducer 170a and/or 170b is configured to generate an interference cancellation signal comprising, for example, at least one delayed replica of the wireless communications from the second radiotelephone 120b that are received by the ancillary terrestrial component 140, and to subtract the delayed replica of the wireless communications from the second radiotelephone 120b that are received by the ancillary terrestrial component 140 from the wireless communications that are received from the space-based component 110. The interference reduction signal may be transmitted from the ancillary terrestrial component 140 to the gateway 160 over link 142 and/or using other conventional techniques.

Thus, adaptive interference reduction techniques may be used to at least partially cancel the interfering signal, so that the same, or other nearby, satellite radiotelephone uplink frequency can be used in a given cell for communications by radiotelephones 120 with the satellite 110 and with the ancillary terrestrial component 140. Accordingly, all frequencies that are assigned to a given cell 130 may be used for both radiotelephone 120 communications with the space-based component 110 and with the ancillary terrestrial component 140. Conventional systems may avoid terrestrial reuse of frequencies within a given satellite cell that are being used within the satellite cell for satellite communications. Stated differently, conventionally, only frequencies used by other satellite cells may be candidates for terrestrial reuse within a given satellite cell. Beam-to-beam spatial isolation that is provided by the satellite system was relied upon to reduce or minimize the level of interference from the terrestrial operations into the satellite operations. In sharp contrast, embodiments of the invention can use an interference reducer to allow all frequencies assigned to a satellite cell to be used terrestrially and for satellite radiotelephone communications.

Embodiments of the invention according to FIG. 1 may arise from a realization that the return link signal from the second radiotelephone 120b at $f_U$ generally will be received and processed by the ancillary terrestrial component 140 much earlier relative to the time when it will arrive at the satellite gateway 160 from the space-based component 110 via the interference path 150. Accordingly, the interference signal at the satellite gateway 160b can be at least partially canceled. Thus, as shown in FIG. 1, an interference cancellation signal, such as the demodulated ancillary terrestrial component signal, can be sent to the satellite gateway 160b by the interference reducer 170a in the ancillary terrestrial component 140, for example using link 142. In the interference reducer 170b at the gateway 160b, a weighted (in amplitude and/or phase) replica of the signal may be formed using, for example, adaptive transversal filter techniques that are well known to those having skill in the art. Then, a transversal filter output signal is subtracted from the aggregate received satellite signal at frequency $f_U$ that contains desired as well as interference signals. Thus, the interference cancellation need not degrade the signal-to-noise ratio of the desired signal at the gateway 160, because a regenerated (noise-free) terrestrial signal, for example as regenerated by the ancillary terrestrial component 140, can be used to perform interference suppression.

Figure 2:
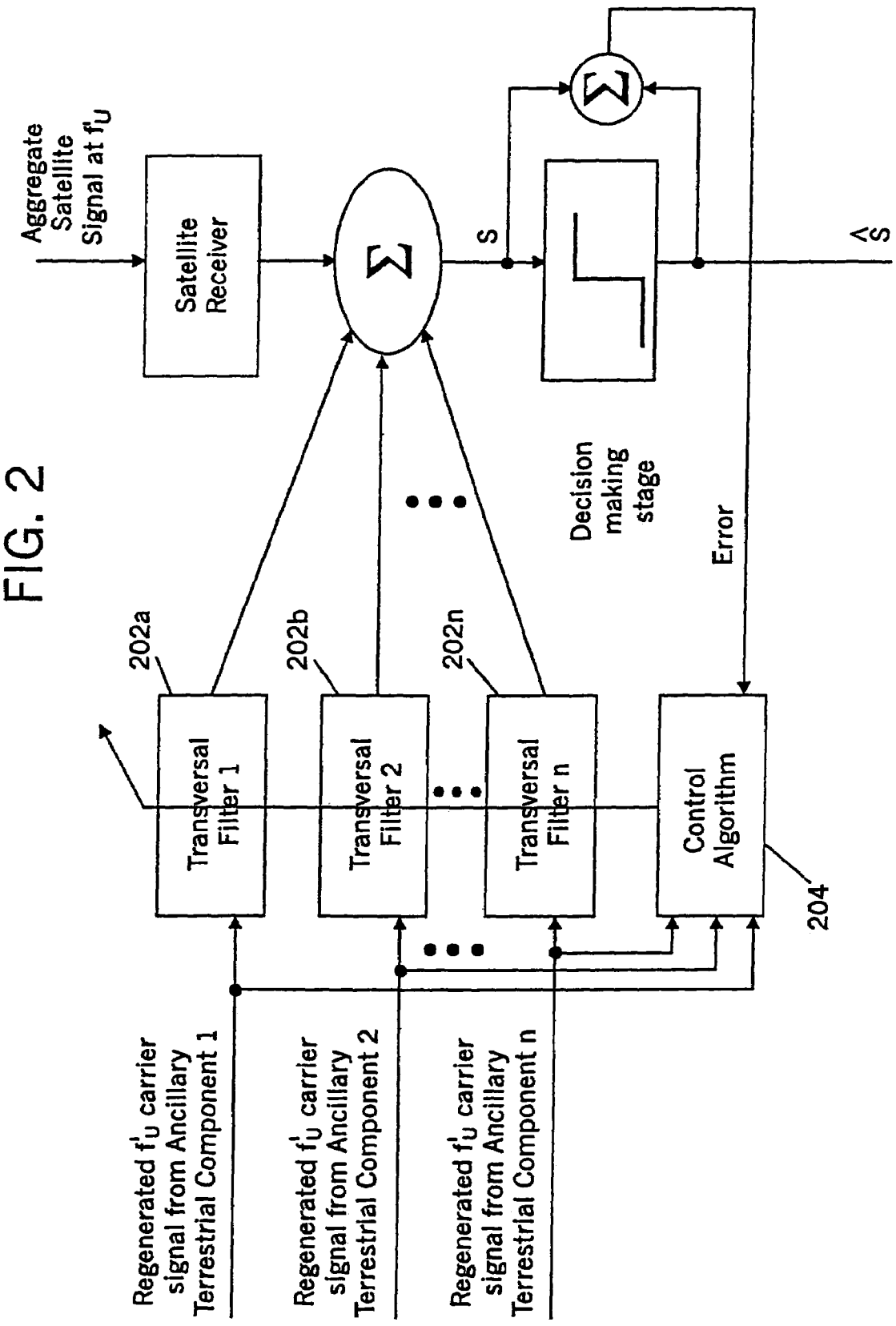
FIG. 2 is a block diagram of adaptive interference reducers according to embodiments of the present invention.

FIG. 2 is a block diagram of embodiments of adaptive interference cancellers that may be located in the ancillary terrestrial component 140, in the gateway 160, and/or in another component of the cellular radiotelephone system 100. As shown in FIG. 2, one or more control algorithms 204, known to those having skill in the art, may be used to adaptively adjust the coefficients of a plurality of transversal filters 202a-202n. Adaptive algorithms, such as Least Mean Square Error (LMSE), Kalman, Fast Kalman, Zero Forcing and/or various combinations thereof or other techniques may be used. It will be understood by those having skill in the art that the architecture of FIG. 2 may be used with an LMSE algorithm. However, it also will be understood by those having skill in the art that conventional architectural modifications may be made to facilitate other control algorithms.

Figure 3:
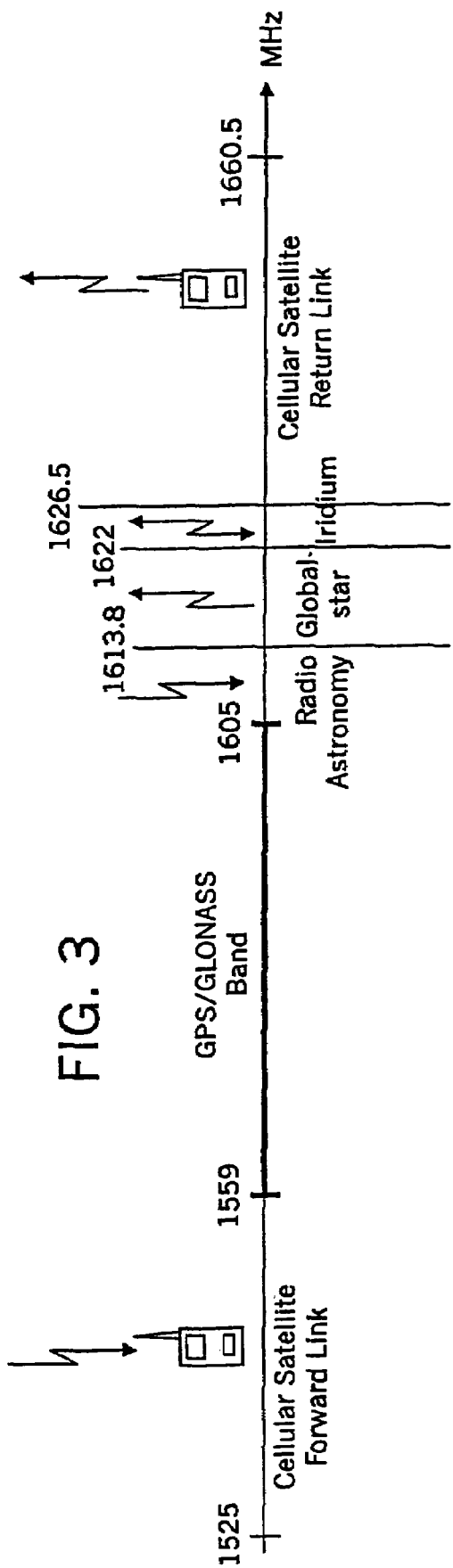
FIG. 3 is a spectrum diagram that illustrates satellite L-band frequency allocations.

Additional embodiments of the invention now will be described with reference to FIG. 3, which illustrates L-band frequency allocations including cellular radiotelephone system forward links and return links. As shown in FIG. 3, the space-to-ground L-band forward link (downlink) frequencies are assigned from 1525 MHz to 1559 MHz. The ground-to-space L-band return link (uplink) frequencies occupy the band from 1626.5 MHz to 1660.5 MHz. Between the forward and return L-band links lie the GPS/GLONASS radionavigation band (from 1559 MHz to 1605 MHz).

In the detailed description to follow, GPS/GLONASS will be referred to simply as GPS for the sake of brevity. Moreover, the acronyms ATC and SBC will be used for the ancillary terrestrial component and the space-based component, respectively, for the sake of brevity.

As is known to those skilled in the art, GPS receivers may be extremely sensitive since they are designed to operate on very weak spread-spectrum radionavigation signals that arrive on the earth from a GPS satellite constellation. As a result, GPS receivers may to be highly susceptible to in-band interference. ATCs that are configured to radiate L-band frequencies in the forward satellite band (1525 to 1559 MHz) can be designed with very sharp out-of-band emissions filters to satisfy the stringent out-of-band spurious emissions desires of GPS.

Referring again to FIG. 1, some embodiments of the invention can provide systems and methods that can allow an ATC 140 to configure itself in one of at least two modes. In accordance with a first mode, which may be a standard mode and may provide highest capacity, the ATC 140 transmits to the radiotelephones 120 over the frequency range from 1525 MHz to 1559 MHz, and receives transmissions from the radiotelephones 120 in the frequency range from 1626.5 MHz to 1660.5 MHz, as illustrated in FIG. 3. In contrast, in a second mode of operation, the ATC 140 transmits wireless communications to the radiotelephones 120 over a modified range of satellite band forward link (downlink) frequencies. The modified range of satellite band forward link frequencies may be selected to reduce, compared to the unmodified range of satellite band forward link frequencies, interference with wireless receivers such as GPS receivers that operate outside the range of satellite band forward link frequencies.

Many modified ranges of satellite band forward link frequencies may be provided according to embodiments of the present invention. In some embodiments, the modified range of satellite band forward link frequencies can be limited to a subset of the original range of satellite band forward link frequencies, so as to provide a guard band of unused satellite band forward link frequencies. In other embodiments, all of the satellite band forward link frequencies are used, but the wireless communications to the radiotelephones are modified in a manner to reduce interference with wireless receivers that operate outside the range of satellite band forward link frequencies. Combinations and subcombinations of these and/or other techniques also may be used, as will be described below.

It also will be understood that embodiments of the invention that will now be described in connection with FIGS. 4-12 will be described in terms of multiple mode ATCs 140 that can operate in a first standard mode using the standard forward and return links of FIG. 3, and in a second or alternate mode that uses a modified range of satellite band forward link frequencies and/or a modified range of satellite band return link frequencies. These multiple mode ATCs can operate in the second, non-standard mode, as long as desirable, and can be switched to standard mode otherwise. However, other embodiments of the present invention need not provide multiple mode ATCs but, rather, can provide ATCs that operate using the modified range of satellite band forward link and/or return link frequencies.

Embodiments of the invention now will be described, wherein an ATC operates with an SBC that is configured to receive wireless communications from radiotelephones over a first range of satellite band return link frequencies and to transmit wireless communications to the radiotelephones over a second range of satellite band forward link frequencies that is spaced apart from the first range. According to these embodiments, the ATC is configured to use at least one time division duplex frequency to transmit wireless communications to the radiotelephones and to receive wireless communications from the radiotelephones at different times. In particular, in some embodiments, the at least one time division duplex frequency that is used to transmit wireless communications to the radiotelephones and to receive wireless communications from the radiotelephones at different times, comprises a frame including a plurality of slots. At least a first one of the slots is used to transmit wireless communications to the radiotelephones and at least a second one of the slots is used to receive wireless communications from the radiotelephones. Thus, in some embodiments, the ATC transmits and receives, in Time Division Duplex (TDD) mode, using frequencies from 1626.5 MHz to 1660.5 MHz. In some embodiments, all ATCs across the entire network may have the stated configuration/reconfiguration flexibility. In other embodiments, only some ATCs may be reconfigurable.

Figure 5:
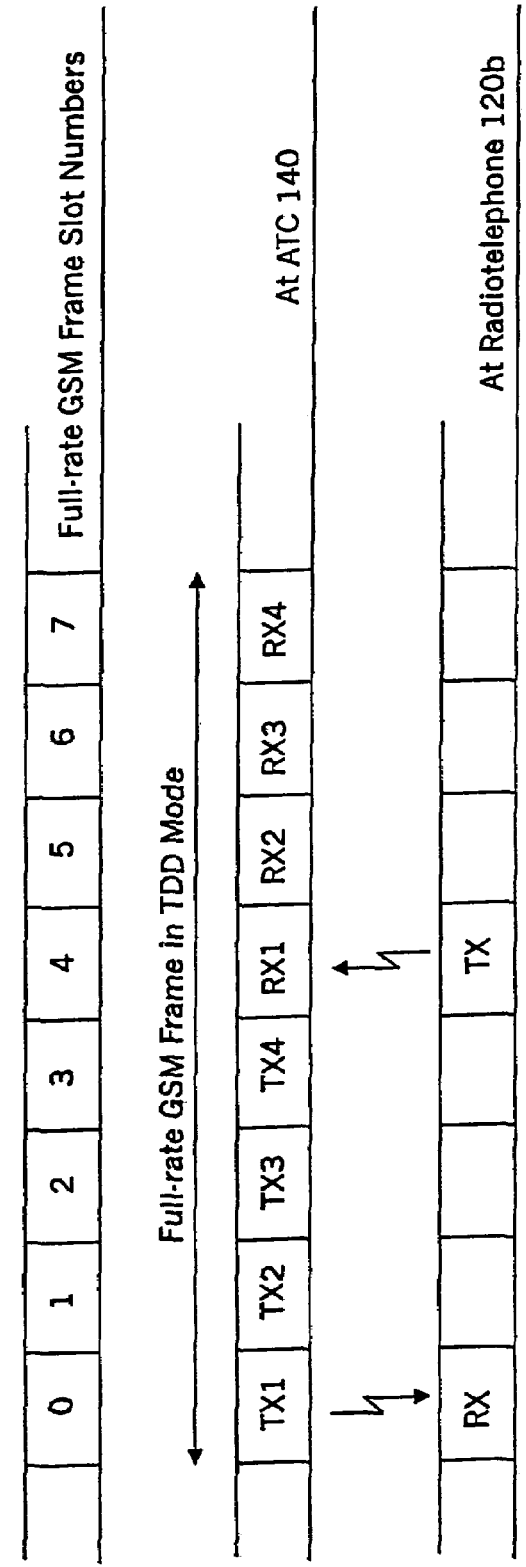
FIG. 5 illustrates time division duplex frame structures according to embodiments of the present invention.
Figure 4:
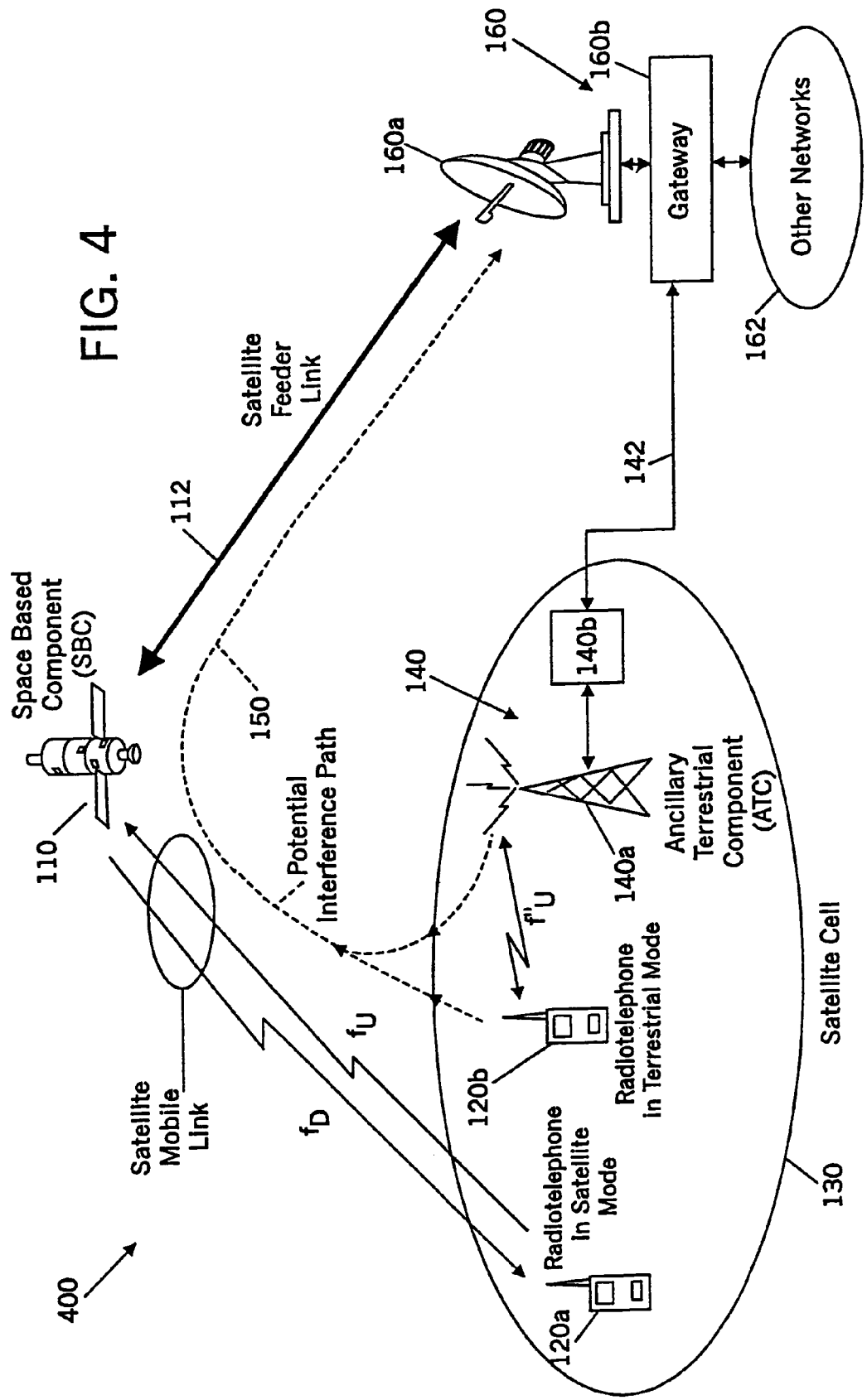
FIG. 4 is a schematic diagram of cellular satellite systems and methods according to other embodiments of the present invention.

FIG. 4 illustrates satellite systems and methods 400 according to some embodiments of the invention, including an ATC 140 communicating with a radiotelephone 120b using a carrier frequency $f''_U$ in TDD mode. FIG. 5 illustrates an embodiment of a TDD frame structure. Assuming full-rate GSM (eight time slots per frame), up to four full-duplex voice circuits can be supported by one TDD carrier. As shown in FIG. 5, the ATC 140 transmits to the radiotelephone 120b over, for example, time slot number 0. The radiotelephone

120b receives and replies back to the ATC 140 over, for example, time slot number 4. Time slots number 1 and 5 may be used to establish communications with another radiotelephone, and so on.

A Broadcast Control CHannel (BCCH) is preferably transmitted from the ATC 140 in standard mode, using a carrier frequency from below any guard band exclusion region. In other embodiments, a BCCH also can be defined using a TDD carrier. In any of these embodiments, radiotelephones in idle mode can, per established GSM methodology, monitor the BCCH and receive system-level and paging information. When a radiotelephone is paged, the system decides what type of resource to allocate to the radiotelephone in order to establish the communications link. Whatever type of resource is allocated for the radiotelephone communications channel (TDD mode or standard mode), the information is communicated to the radiotelephone, for example as part of the call initialization routine, and the radiotelephone configures itself appropriately.

It may be difficult for the TDD mode to co-exist with the standard mode over the same ATC, due, for example, to the ATC receiver LNA stage. In particular, assuming a mixture of standard and TDD mode GSM carriers over the same ATC, during the part of the frame when the TDD carriers are used to serve the forward link (when the ATC is transmitting TDD) enough energy may leak into the receiver front end of the same ATC to desensitize its LNA stage.

Techniques can be used to suppress the transmitted ATC energy over the 1600 MHz portion of the band from desensitizing the ATC's receiver LNA, and thereby allow mixed standard mode and TDD frames. For example, isolation between outbound and inbound ATC front ends and/or antenna system return loss may be increased or maximized. A switchable band-reject filter may be placed in front of the LNA stage. This filter would be switched in the receiver chain (prior to the LNA) during the part of the frame when the ATC is transmitting TDD, and switched out during the rest of the time. An adaptive interference canceller can be configured at RF (prior to the LNA stage). If such techniques are used, suppression of the order of 70 dB can be attained, which may allow mixed standard mode and TDD frames. However, the ATC complexity and/or cost may increase.

Thus, even though ATC LNA desensitization may be reduced or eliminated, it may use significant special engineering and attention and may not be economically worth the effort. Other embodiments, therefore, may keep TDD ATCs pure TDD, with the exception, perhaps, of the BCCH carrier which may not be used for traffic but only for broadcasting over the first part of the frame, consistent with TDD protocol. Moreover, Random Access CHannel (RACH) bursts may be timed so that they arrive at the ATC during the second half of the TDD frame. In some embodiments, all TDD ATCs may be equipped to enable reconfiguration in response to a command.

It is well recognized that during data communications or other applications, the forward link may use transmissions at higher rates than the return link. For example, in web browsing with a radiotelephone, mouse clicks and/or other user selections typically are transmitted from the radiotelephone to the system. The system, however, in response to a user selection, may have to send large data files to the radiotelephone. Hence, other embodiments of the invention may be configured to enable use of an increased or maximum number of time slots per forward GSM carrier frame, to provide a higher downlink data rate to the radiotelephones.

Thus, when a carrier frequency is configured to provide service in TDD mode, a decision may be made as to how many slots will be allocated to serving the forward link, and how many will be dedicated to the return link. Whatever the decision is, it may be desirable that it be adhered to by all TDD carriers used by the ATC, in order to reduce or avoid the LNA desensitization problem described earlier. In voice communications, the partition between forward and return link slots may be made in the middle of the frame as voice activity typically is statistically bidirectionally symmetrical. Hence, driven by voice, the center of the frame may be where the TDD partition is drawn.

To increase or maximize forward link throughput in data mode, data mode TDD carriers according to embodiments of the invention may use a more spectrally efficient modulation and/or protocol, such as the EDGE modulation and/or protocol, on the forward link slots. The return link slots may be based on a less spectrally efficient modulation and/or protocol such as the GPRS (GMSK) modulation and/or protocol. The EDGE modulation/protocol and the GPRS modulation/protocol are well known to those having skill in the art, and need not be described further herein.

Given an EDGE forward/GPRS return TDD carrier strategy, up to $(384/2)=192$ kbps may be supported on the forward link while on the return link the radiotelephone may transmit at up to $(115/2)\approx 64$ kbps.

In other embodiments, it also is possible to allocate six time slots of an eight-slot frame for the forward link and only two for the return link. In these embodiments, for voice services, given the statistically symmetric nature of voice, the return link vocoder may need to be comparable with quarter-rate GSM, while the forward link vocoder can operate at full-rate GSM, to yield six full-duplex voice circuits per GSM TDD-mode carrier (a voice capacity penalty of 25%). Subject to this non-symmetrical partitioning strategy, data rates of up to $(384)(6/8)=288$ kbps may be achieved on the forward link, with up to $(115)(2/8)\approx 32$ kbps on the return link.

Figure 6:
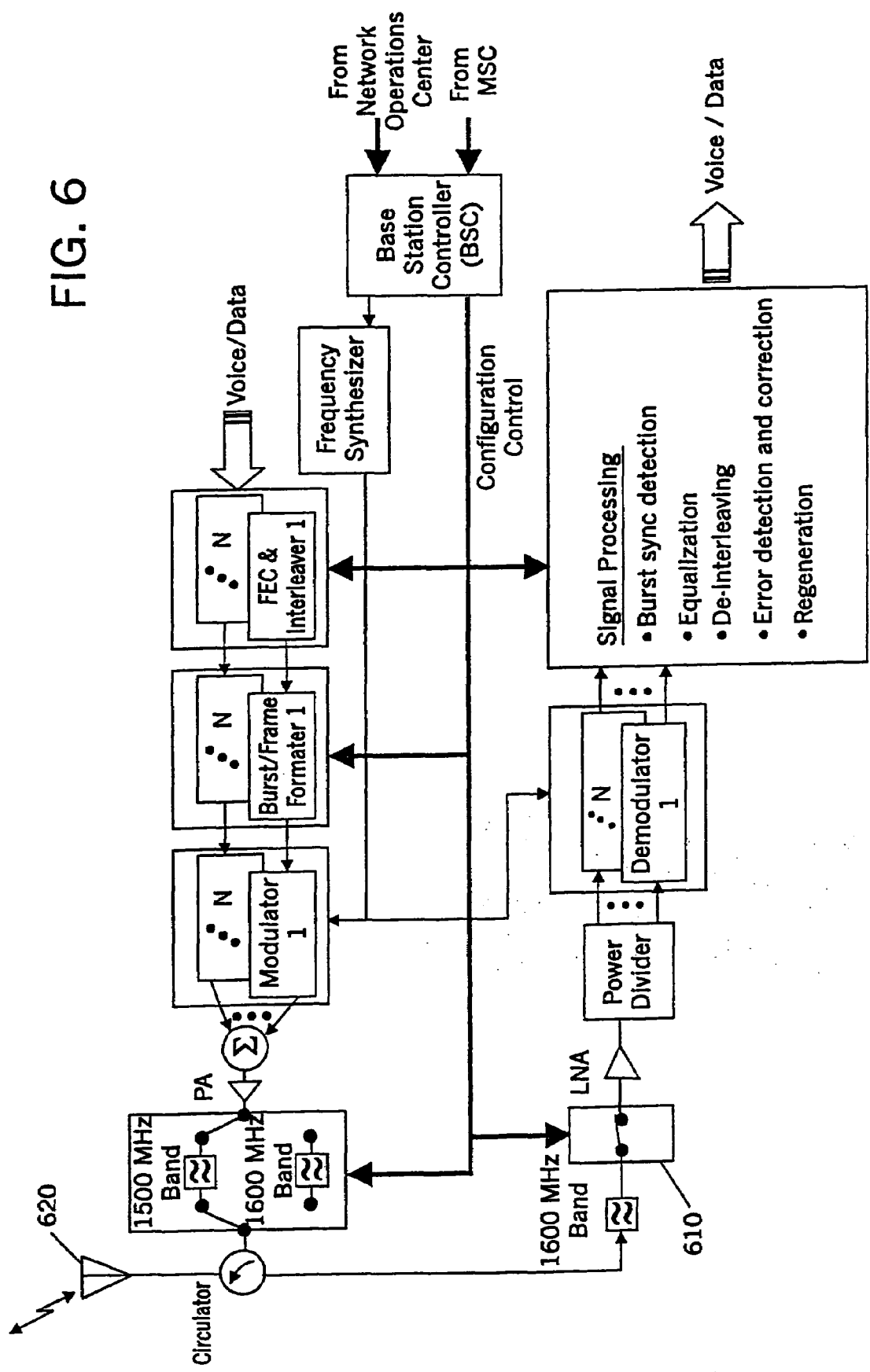
FIG. 6 is a block diagram of architectures of ancillary terrestrial components according to embodiments of the invention.

FIG. 6 depicts an ATC architecture according to embodiments of the invention, which can lend itself to automatic configuration between the two modes of standard GSM and TDD GSM on command, for example, from a Network Operations Center (NOC) via a Base Station Controller (BSC). It will be understood that in these embodiments, an antenna 620 can correspond to the antenna 140a of FIGS. 1 and 4, and the remainder of FIG. 6 can correspond to the electronics system 140b of FIGS. 1 and 4. If a reconfiguration command for a particular carrier, or set of carriers, occurs while the carrier(s) are active and are supporting traffic, then, via the in-band signaling Fast Associated Control CHannel (FACCH), all affected radiotelephones may be notified to also reconfigure themselves and/or switch over to new resources. If carrier(s) are reconfigured from TDD mode to standard mode, automatic reassignment of the carrier(s) to the appropriate standard-mode ATCs, based, for example, on capacity demand and/or reuse pattern can be initiated by the NOC. If, on the other hand, carrier(s) are reconfigured from standard mode to TDD mode, automatic reassignment to the appropriate TDD-mode ATCs can take place on command from the NOC.

Still referring to FIG. 6, a switch 610 may remain closed when carriers are to be demodulated in the standard mode. In TDD mode, this switch 610 may be open during the first half of the frame, when the ATC is transmitting, and closed during the second half of the frame, when the ATC is receiving. Other embodiments also may be provided.

FIG. 6 assumes N transceivers per ATC sector, where N can be as small as one, since a minimum of one carrier per sector generally is desired. Each transceiver is assumed to operate over one GSM carrier pair (when in standard mode) and can thus support up to eight full-duplex voice circuits, neglecting BCCH channel overhead. Moreover, a standard GSM carrier pair can support sixteen full-duplex voice circuits when in half-rate GSM mode, and up to thirty two full-duplex voice circuits when in quarter-rate GSM mode.

Figure 7:
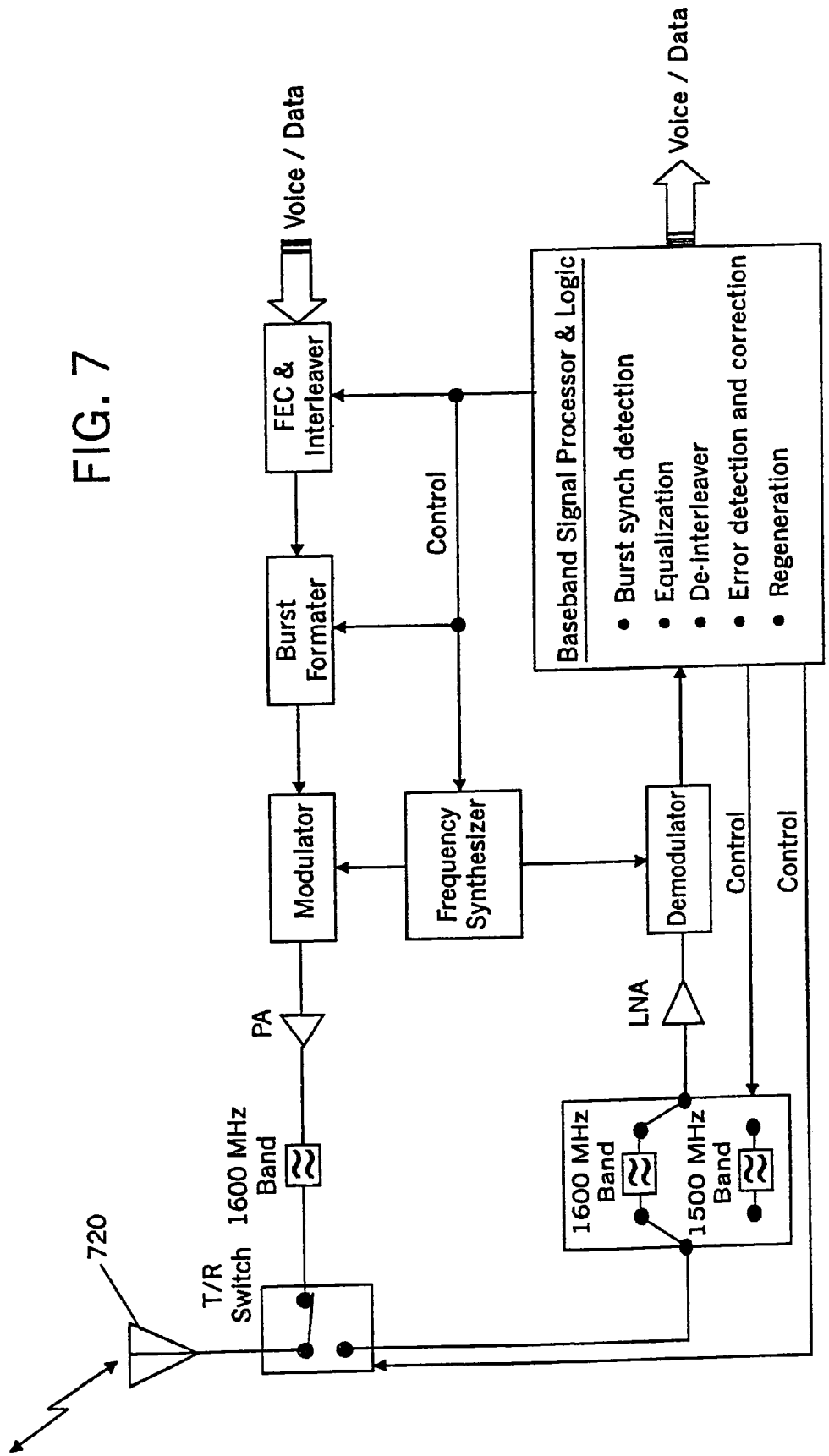
FIG. 7 is a block diagram of architectures of reconfigurable radiotelephones according to embodiments of the invention.

When in TDD mode, the number of full duplex voice circuits may be reduced by a factor of two, assuming the same vocoder. However, in TDD mode, voice service can be offered via the half-rate GSM vocoder with almost imperceptible quality degradation, in order to maintain invariant voice capacity. FIG. 7 is a block diagram of a reconfigurable radiotelephone architecture that can communicate with a reconfigurable ATC architecture of FIG. 6. In FIG. 7, an antenna 720 is provided, and the remainder of FIG. 7 can provide embodiments of an electronics system for the radiotelephone.

It will be understood that the ability to reconfigure ATCs and radiotelephones according to embodiments of the invention may be obtained at a relatively small increase in cost. The cost may be mostly in Non-Recurring Engineering (NRE) cost to develop software. Some recurring cost may also be incurred, however, in that at least an additional RF filter and a few electronically controlled switches may be used per ATC and radiotelephone. All other hardware/software can be common to standard-mode and TDD-mode GSM.

Figure 8:
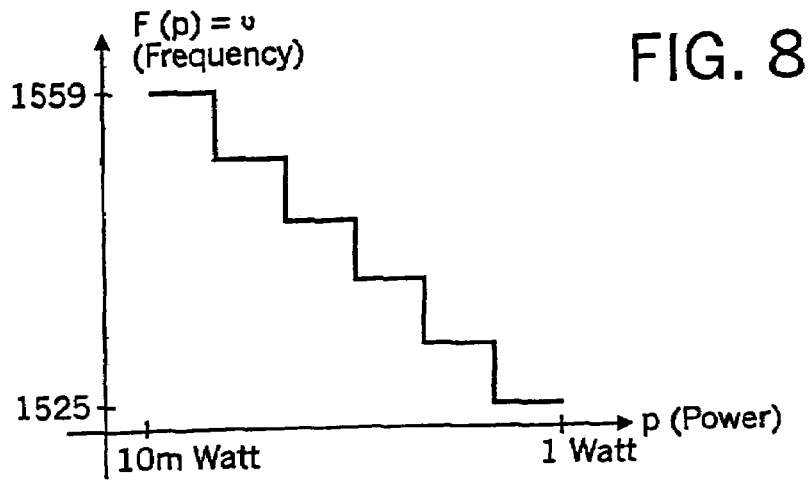
FIG. 8 graphically illustrates mapping of monotonically decreasing power levels to frequencies according to embodiments of the present invention.

Referring now to FIG. 8, other radiotelephone systems and methods according to embodiments of the invention now will be described. In these embodiments, the modified second range of satellite band forward link frequencies includes a plurality of frequencies in the second range of satellite band forward link frequencies that are transmitted by the ATCs to the radiotelephones at a power level, such as maximum power level, that monotonically decreases as a function of (increasing) frequency. More specifically, as will be described below, in some embodiments, the modified second range of satellite band forward link frequencies includes a subset of frequencies proximate to a first or second end of the range of satellite band forward link frequencies that are transmitted by the ATC to the radiotelephones at a power level, such as a maximum power level, that monotonically decreases toward the first or second end of the second range of satellite band forward link frequencies. In still other embodiments, the first range of satellite band return link frequencies is contained in an L-band of satellite frequencies above GPS frequencies and the second range of satellite band forward link frequencies is contained in the L-band of satellite frequencies below the GPS frequencies. The modified second range of satellite band forward link frequencies includes a subset of frequencies proximate to an end of the second range of satellite band forward link frequencies adjacent the GPS frequencies that are transmitted by the ATC to the radiotelephones at a power level, such as a maximum power level, that monotonically decreases toward the end of the second range of satellite band forward link frequencies adjacent the GPS frequencies.

Without being bound by any theory of operation, a theoretical discussion of the mapping of ATC maximum power levels to carrier frequencies according to embodiments of the present invention now will be described. Referring to FIG. 8, let $v=F(\rho)$ represent a mapping from the power ($\rho$) domain to the frequency (v) range. The power ($\rho$) is the power that an ATC uses or should transmit in order to reliably communicate with a given radiotelephone. This power may depend on many factors such as the radiotelephone's distance from the ATC, the blockage between the radiotelephone and the ATC, the level of multipath fading in the channel, etc., and as a result, will, in general, change as a function of time. Hence, the power used generally is determined adaptively (iteratively) via closed-loop power control, between the radiotelephone and ATC.

The frequency (v) is the satellite carrier frequency that the ATC uses to communicate with the radiotelephone. According to embodiments of the invention, the mapping F is a monotonically decreasing function of the independent variable $\rho$. Consequently, in some embodiments, as the maximum ATC power increases, the carrier frequency that the ATC uses to establish and/or maintain the communications link decreases. FIG. 8 illustrates an embodiment of a piece-wise continuous monotonically decreasing (stair-case) function. Other monotonic functions may be used, including linear and/or nonlinear, constant and/or variable decreases. FACCH or Slow Associated Control CHannel (SACCH) messaging may be used in embodiments of the invention to facilitate the mapping adaptively and in substantially real time.

Figure 9:
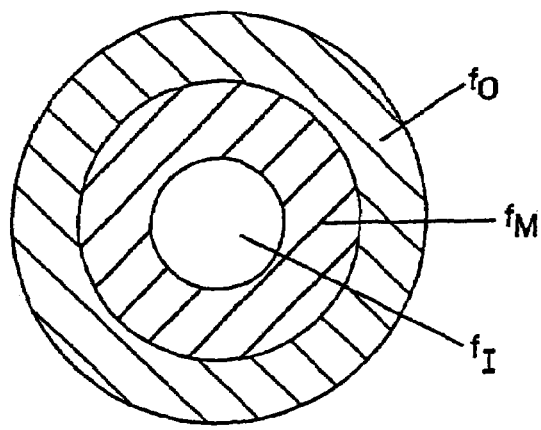
FIG. 9 illustrates an ideal cell that is mapped to three power regions and three associated carrier frequencies according to embodiments of the invention.

FIG. 9 depicts an ideal cell according to embodiments of the invention, where, for illustration purposes, three power regions and three associated carrier frequencies (or carrier frequency sets) are being used to partition a cell. For simplicity, one ATC transmitter at the center of the idealized cell is assumed with no sectorization. In embodiments of FIG. 9, the frequency (or frequency set) $f_I$ is taken from substantially the upper-most portion of the L-band forward link frequency set, for example from substantially close to 1559 MHz (see FIG. 3). Correspondingly, the frequency (or frequency set) $f_M$ is taken from substantially the central portion of the L-band forward link frequency set (see FIG. 3). In concert with the above, the frequency (or frequency set) $f_O$ is taken from substantially the lowest portion of the L-band forward link frequencies, for example close to 1525 MHz (see FIG. 3).

Thus, according to embodiments of FIG. 9, if a radiotelephone is being served within the outer-most ring of the cell, that radiotelephone is being served via frequency $f_O$. This radiotelephone, being within the furthest area from the ATC, has (presumably) requested maximum (or near maximum) power output from the ATC. In response to the maximum (or near maximum) output power request, the ATC uses its a priori knowledge of power-to-frequency mapping, such as a three-step staircase function of FIG. 9. Thus, the ATC serves the radiotelephone with a low-value frequency taken from the lowest portion of the mobile L-band forward link frequency set, for example, from as close to 1525 MHz as possible. This, then, can provide additional safeguard to any GPS receiver unit that may be in the vicinity of the ATC.

Embodiments of FIG. 9 may be regarded as idealized because they associate concentric ring areas with carrier frequencies (or carrier frequency sets) used by an ATC to serve its area. In reality, concentric ring areas generally will not be the case. For example, a radiotelephone can be close to the ATC that is serving it, but with significant blockage between the radiotelephone and the ATC due to a building. This radiotelephone, even though relatively close to the ATC, may also request maximum (or near maximum) output power from the ATC. With this in mind, FIG. 10 may depict a more realistic set of area contours that may be associated with the frequencies being used by the ATC to serve its territory, according to embodiments of the invention. The frequency (or frequency set) $f_I$ may be reused in the immediately adjacent ATC cells owing to the limited geographical span associated with $f_I$ relative to the distance between cell centers. This may also hold for $f_M$.

Figure 11:
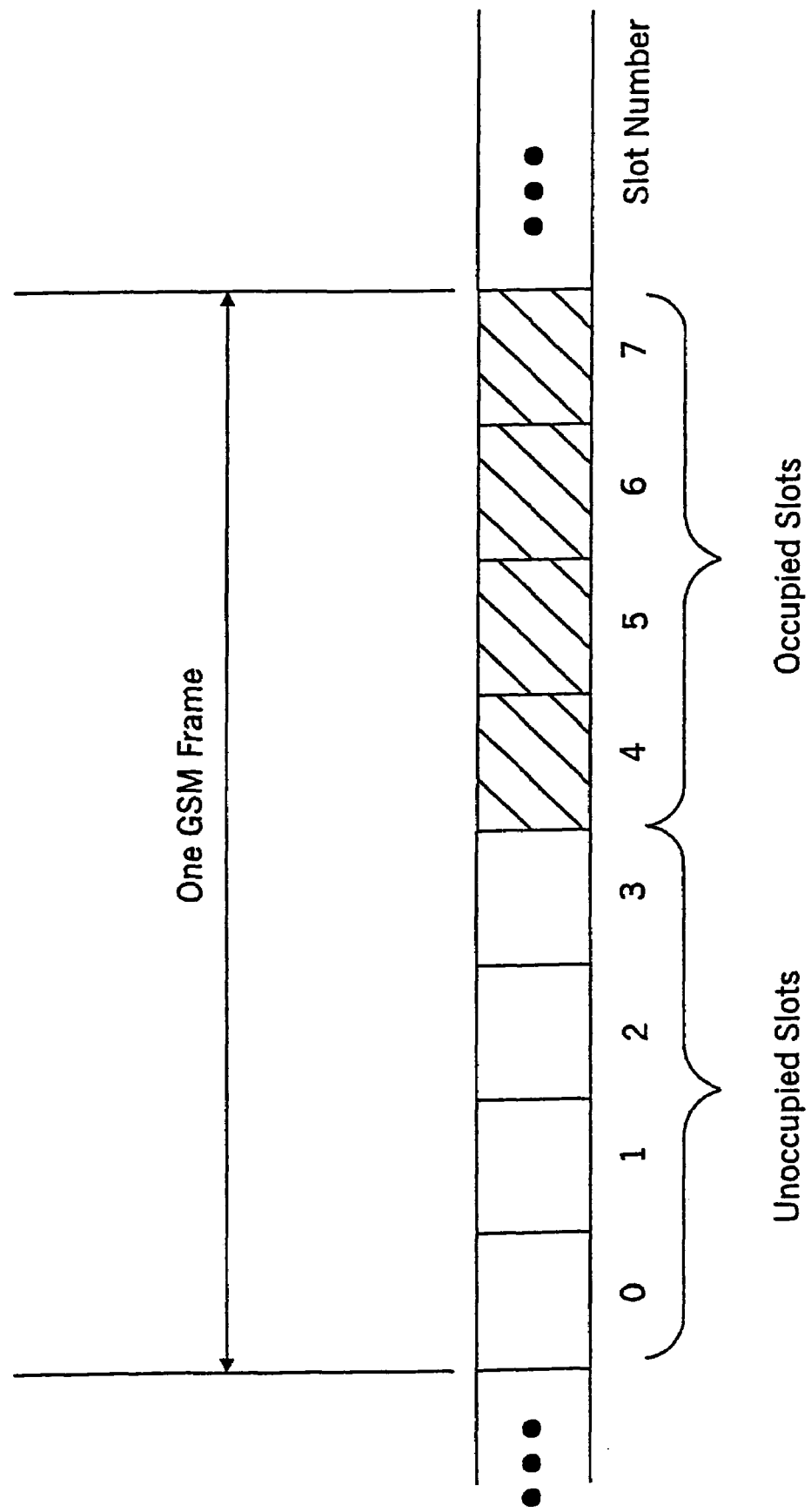
FIG. 11 illustrates two or more contiguous slots in a frame that are unoccupied according to embodiments of the present invention.

Referring now to FIG. 11, other modified second ranges of satellite band forward link frequencies that can be used by ATCs according to embodiments of the present invention now will be described. In these embodiments, at least one frequency in the modified second range of satellite band forward link frequencies that is transmitted by the ATC to the radiotelephones comprises a frame including a plurality of slots. In these embodiments, at least two contiguous slots in the frame that is transmitted by the ATC to the radiotelephones are left unoccupied. In other embodiments, three contiguous slots in the frame that is transmitted by the ATC to the radiotelephones are left unoccupied. In yet other embodiments, at least two contiguous slots in the frame that is transmitted by the ATC to the radiotelephones are transmitted at lower power than remaining slots in the frame. In still other embodiments, three contiguous slots in the frame that is transmitted by the ATC to the radiotelephones are transmitted at lower power than remaining slots in the frame. In yet other embodiments, the lower power slots may be used with first selected ones of the radiotelephones that are relatively close to the ATC and/or are experiencing relatively small signal blockage, and the remaining slots are transmitted at higher power to second selected ones of the radiotelephones that are relatively far from the ATC and/or are experiencing relatively high signal blockage.

Stated differently, in accordance with some embodiments of the invention, only a portion of the TDMA frame is utilized. For example, only the first four (or last four, or any contiguous four) time slots of a full-rate GSM frame are used to support traffic. The remaining slots are left unoccupied (empty). In these embodiments, capacity may be lost. However, as has been described previously, for voice services, half-rate and even quarter-rate GSM may be invoked to gain capacity back, with some potential degradation in voice quality. The slots that are not utilized preferably are contiguous, such as slots 0 through 3 or 4 through 7 (or 2 through 5, etc.). The use of non-contiguous slots such as 0, 2, 4, and 6, for example, may be less desirable. FIG. 11 illustrates four slots (4-7) being used and four contiguous slots (0-3) being empty in a GSM frame.

It has been found experimentally, according to these embodiments of the invention, that GPS receivers can perform significantly better when the interval between interference bursts is increased or maximized. Without being bound by any theory of operation, this effect may be due to the relationship between the code repetition period of the GPS C/A code (1 msec.) and the GSM burst duration (about 0.577 msec.). With a GSM frame occupancy comprising alternate slots, each GPS signal code period can experience at least one "hit", whereas a GSM frame occupancy comprising four to five contiguous slots allows the GPS receiver to derive sufficient clean information so as to "flywheel" through the error events.

Figure 10:
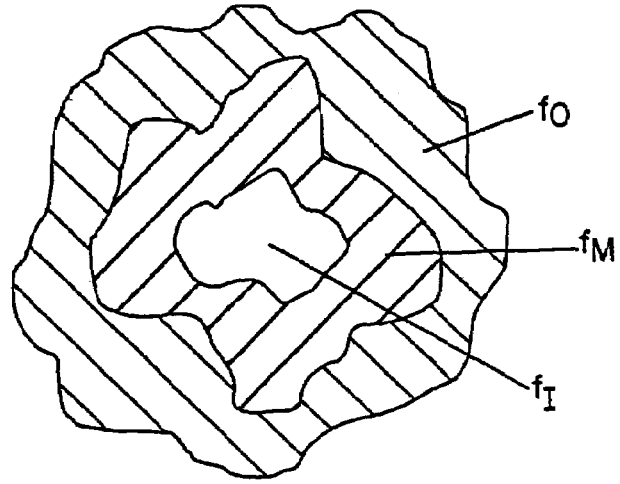
FIG. 10 depicts a realistic cell that is mapped to three power regions and three associated carrier frequencies according to embodiments of the invention.

According to other embodiments of the invention, embodiments of FIGS. 8-10 can be combined with embodiments of FIG. 11. Furthermore, according to other embodiments of the invention, if an $f_I$ carrier of FIGS. 9 or 10 is underutilized, because of the relatively small footprint of the inner-most region of the cell, it may be used to support additional traffic over the much larger outermost region of the cell.

Figure 12:
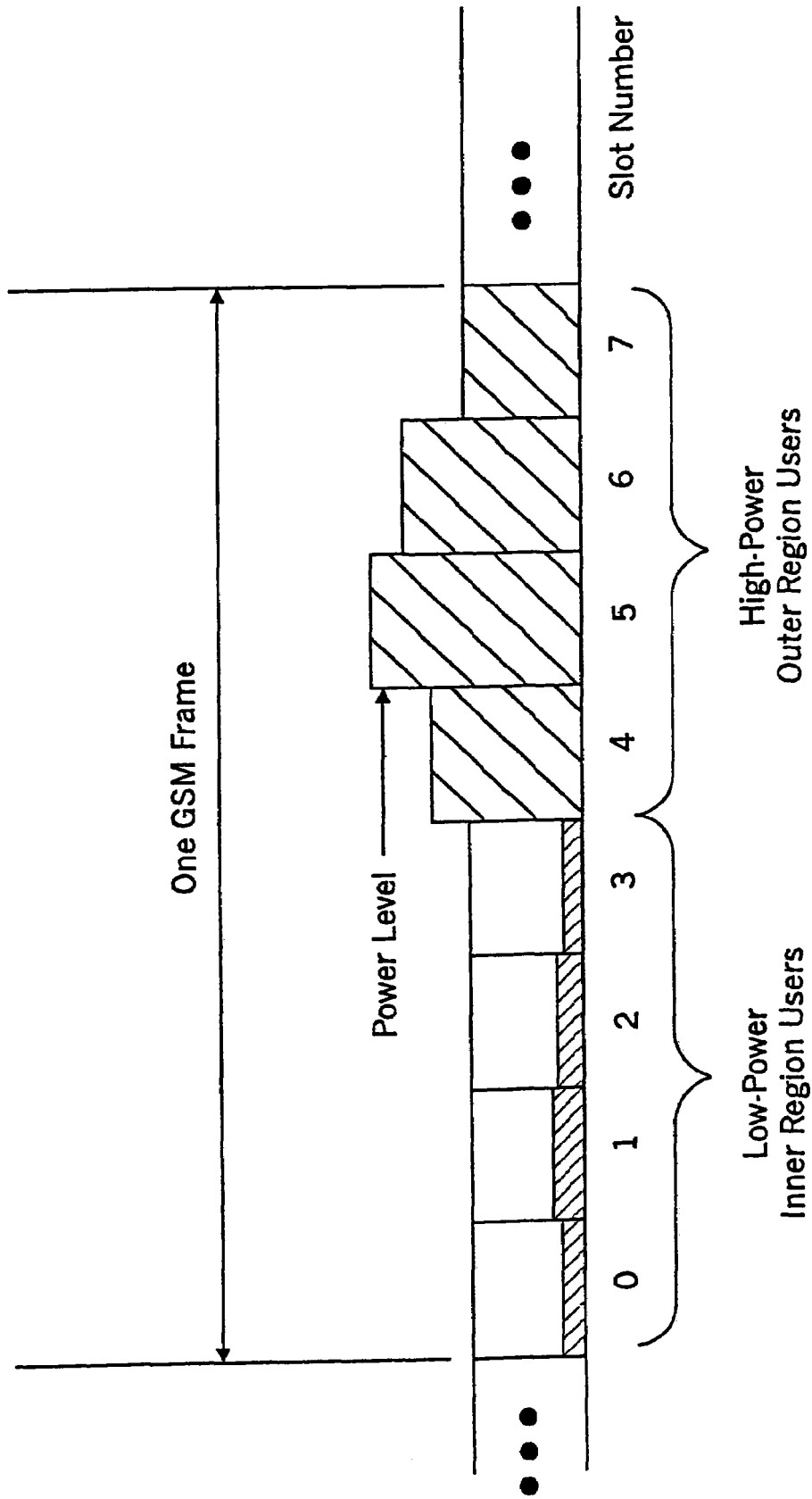
FIG. 12 illustrates loading of two or more contiguous slots with lower power transmissions according to embodiments of the present invention.

Thus, for example, assume that only the first four slots in each frame of $f_I$ are being used for inner region traffic. In embodiments of FIGS. 8-10, these four $f_I$ slots are carrying relatively low power bursts, for example of the order of 100 mW or less, and may, therefore, appear as (almost) unoccupied from an interference point of view. Loading the remaining four (contiguous) time slots of $f_I$ with relatively high-power bursts may have negligible effect on a GPS receiver because the GPS receiver would continue to operate reliably based on the benign contiguous time interval occupied by the four low-power GSM bursts. FIG. 12 illustrates embodiments of a frame at carrier $f_I$ supporting four low-power (inner interval) users and four high-power (outer interval) users. In fact, embodiments illustrated in FIG. 12 may be a preferred strategy for the set of available carrier frequencies that are closest to the GPS band. These embodiments may avoid undue capacity loss by more fully loading the carrier frequencies.

The experimental finding that interference from GSM carriers can be relatively benign to GPS receivers provided that no more than, for example, 5 slots per 8 slot GSM frame are used in a contiguous fashion can be very useful. It can be particularly useful since this experimental finding may hold even when the GSM carrier frequency is brought very close to the GPS band (as close as 1558.5 MHz) and the power level is set relatively high. For example, with five contiguous time slots per frame populated, the worst-case measured GPS receiver may attain at least 30 dB of desensitization margin, over the entire ATC service area, even when the ATC is radiating at 1558.5 MHz. With four contiguous time slots per frame populated, an additional 10 dB desensitization margin may be gained for a total of 40 dB for the worst-case measured GPS receiver, even when the ATC is radiating at 1558.5 MHz.

There still may be concern about the potential loss in network capacity (especially in data mode) that may be incurred over the frequency interval where embodiments of FIG. 11 are used to underpopulate the frame. Moreover, even though embodiments of FIG. 12 can avoid capacity loss by fully loading the carrier, they may do so subject to the constraint of filling up the frame with both low-power and high-power users. Moreover, if forward link carriers are limited to 5 contiguous high power slots per frame, the maximum forward link data rate per carrier that may be aimed at a particular user, may become proportionately less.

Therefore, in other embodiments, carriers which are subject to contiguous empty/low power slots are not used for the forward link. Instead, they are used for the return link. Consequently, in some embodiments, at least part of the ATC is configured in reverse frequency mode compared to the SBC in order to allow maximum data rates over the forward link throughout the entire network. On the reverse frequency return link, a radiotelephone may be limited to a maximum of 5 slots per frame, which can be adequate for the return link. Whether the five available time slots per frame, on a reverse frequency return link carrier, are assigned to one radiotelephone or to five different radiotelephones, they can be assigned contiguously in these embodiments. As was described in connection with FIG. 12, these five contiguous slots can be assigned to high-power users while the remaining three slots may be used to serve low-power users.

Other embodiments may be based on operating the ATC entirely in reverse frequency mode compared to the SBC. In these embodiments, an ATC transmits over the satellite return link frequencies while radiotelephones respond over the satellite forward link frequencies. If sufficient contiguous spectrum exists to support CDMA technologies, and in particular the emerging Wideband-CDMA 3G standard, the ATC forward link can be based on Wideband-CDMA to increase or maximize data throughput capabilities. Interference with GPS may not be an issue since the ATCs transmit over the satellite return link in these embodiments. Instead, interference may become a concern for the radiotelephones. Based, however, on embodiments of FIGS. 11-12, the radiotelephones can be configured to transmit GSM since ATC return link rates are expected, in any event, to be lower than those of the forward link. Accordingly, the ATC return link may employ GPRS-based data modes, possibly even EDGE. Thus, return link carriers that fall within a predetermined frequency interval from the GPS band-edge of 1559 MHz, can be under loaded, per embodiments of FIGS. 11 or 12, to satisfy GPS interference concerns.

Finally, other embodiments may use a partial or total reverse frequency mode and may use CDMA on both forward and return links. In these embodiments, the ATC forward link to the radiotelephones utilizes the frequencies of the satellite return link (1626.5 MHz to 1660.5 MHz) whereas the ATC return link from the radiotelephones uses the frequencies of the satellite forward link (1525 MHz to 1559 MHz). The ATC forward link can be based on an existing or developing CDMA technology (e.g., IS-95, Wideband-CDMA, etc.). The ATC network return link can also be based on an existing or developing CDMA technology provided that the radiotelephone's output is gated to cease transmissions for approximately 3 msec once every T msec. In some embodiments, T will be greater than or equal to 6 msec.

This gating may not be needed for ATC return link carriers at approximately 1550 MHz or below. This gating can reduce or minimize out-of-band interference (desensitization) effects for GPS receivers in the vicinity of an ATC. To increase the benefit to GPS, the gating between all radiotelephones over an entire ATC service area can be substantially synchronized. Additional benefit to GPS may be derived from system-wide synchronization of gating. The ATCs can instruct all active radiotelephones regarding the gating epoch. All ATCs can be mutually synchronized via GPS.

Space-Based Network (SBN) Architectures

As was described above, some embodiments of the present invention may employ a Space-Based Network (SBN) and an Ancillary Terrestrial Network (ATN) that both communicate with a plurality of radiotelephones using satellite radiotelephone frequencies. The SBN may include one or more Space-Based Components (SBC) and one or more satellite gateways. The ATN may include a plurality of Ancillary Terrestrial Components (ATC). In some embodiments, the SBN and the ATN may operate at L-band (1525-1559 MHz forward service link, and 1626.5-1660.5 MHz return service link). Moreover, in some embodiments, the radiotelephones may be similar to conventional handheld cellular/PCS-type terminals that are capable of voice and/or packet data services. In some embodiments, terrestrial reuse of at least some of the mobile satellite frequency spectrum can allow the SBN to serve low density areas that may be impractical and/or uneconomical to serve via conventional terrestrial networks, while allowing the ATN to serve pockets of densely populated areas that may only be effectively served terrestrially. The radiotelephones can be attractive, feature-rich and/or low cost, similar to conventional cellular/PCS-type terminals that are offered by terrestrial-only operators. Moreover, by operating the SBN and ATN modes over the same frequency band, component count in the radiotelephones, for example in the front end radio frequency (RF) section, may be reduced. In particular, in some embodiments, the same frequency synthesizer, RF filters, low noise amplifiers, power amplifiers and antenna elements may be used for terrestrial and satellite communications.

Some embodiments of space-based network architectures according to embodiments of the present invention can offer significant link margin over and above the clear sky conditions, represented by an Additive White Gaussian Noise (AWGN) channel, without the need to undesirably burden the radiotelephones themselves to achieve this link margin. In some embodiments, the SBN may employ relatively large reflectors, for example on the order of about 24 meters in diameter, that can produce relatively small, high gain, agile spot beams. Digital processors in the space-based component and/or at the satellite gateways can be used to improve or optimize performance with respect to each individual user.

In general, space-based networks for a satellite radiotelephone system according to some embodiments of the invention include at least one receive-only satellite and at least one transmit satellite. In some embodiments, the transmit satellite is a transmit-only satellite, whereas in other embodiments, the transmit satellite is a transmit and receive satellite. It will be understood that the terms "receive" and "transmit" are used relative to ground based radiotelephones and that a receive-only satellite and a transmit-only satellite also may transmit to and receive from a gateway or other ground station. The at least one receive-only satellite is configured to receive wireless communications from a radiotelephone at a predetermined location over a satellite frequency band. The at least one transmit satellite is configured to transmit wireless communications to the radiotelephone at the predetermined location over the satellite frequency band. By providing at least one receive-only satellite, link margins may be improved compared to the use of a conventional transmit and receive satellite of comparable antenna sizes, according to some embodiments of the present invention. Accordingly, some embodiments of the invention provide a space-based network for a satellite radiotelephone system that comprises more receive satellites than transmit satellites.

Figure 13:
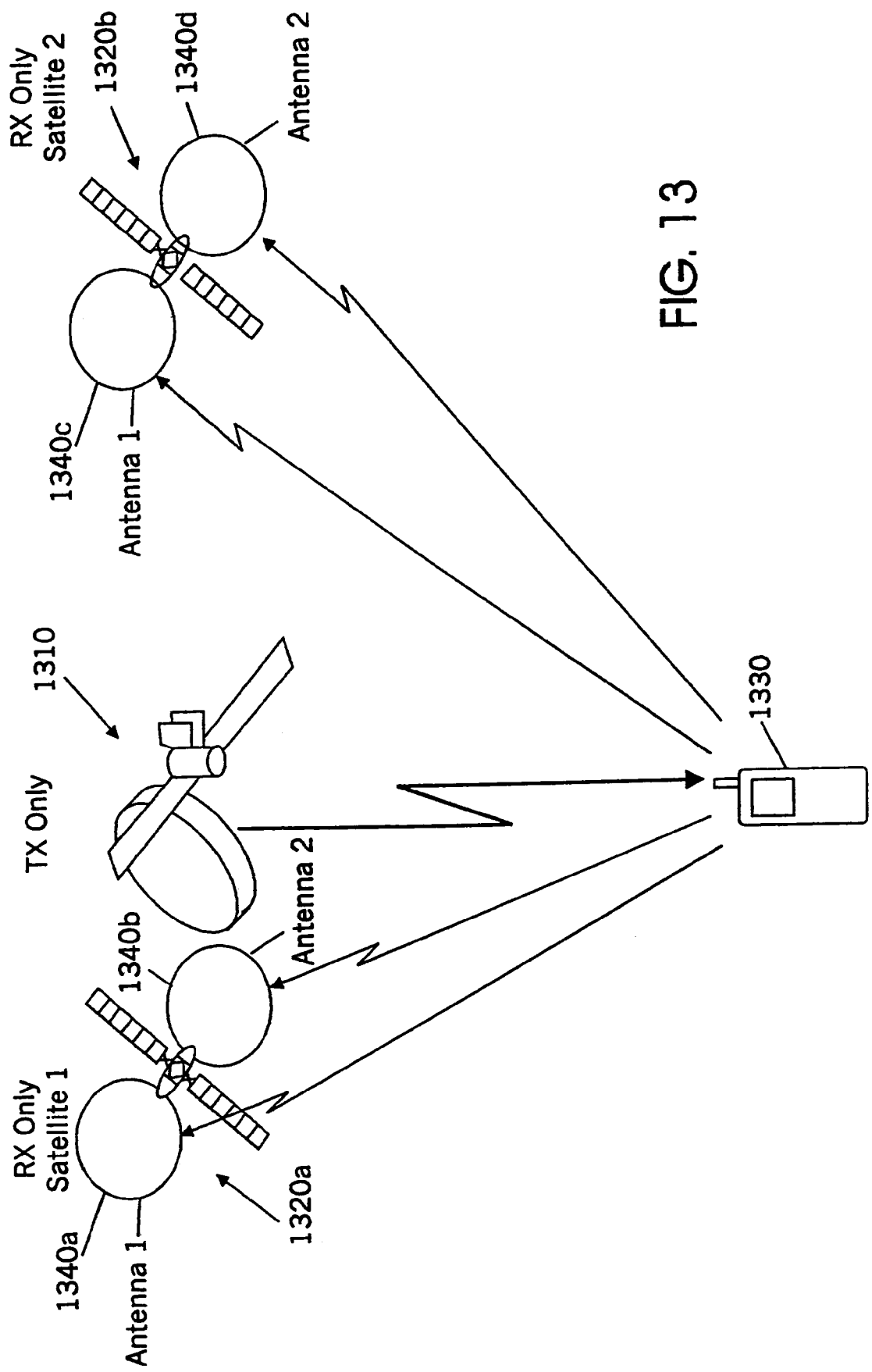
FIG. 13 schematically illustrates the use of transmit-only and receive-only satellites in a space-based network architecture according to embodiments of the present invention.

FIG. 13 conceptually illustrates space-based network architectures according to some embodiments of the present invention. As shown in FIG. 13, at least one transmit-only (TX-only) satellite 1310 and at least one receive-only (RX-only) satellite 1320*a*, 1320*b*, are used to communicate with radiotelephones such as the radiotelephone 1330. As also shown in FIG. 13, a space-based network according to some embodiments of the invention may include a single TX-only satellite 1310 and first and second RX-only satellites 1320*a*, 1320*b*, also referred to as RX-only satellite 1 and RX-only satellite 2, respectively. Finally, as also shown in FIG. 13, in some embodiments of the present invention, the first RX-only satellite 1320*a* may be co-located with the TX-only satellite 1310, and the second RX-only satellite 1320*b* may be located at a different orbital slot.

Referring again to FIG. 13, in some embodiments, each RX-only satellite antenna 1340*a*-1340*d* may be approximately 24 meters in diameter. This can provide a return link aggregate space-based aperture with an equivalent diameter of about 40 meters. The RX-only satellite antennas 1340*a*-1340*d* may be of same size or different sizes. This relatively large, effective return link aperture may be used to allow the SBN to accommodate a relatively low Effective Isotropic Radiated Power (EIRP) on the radiotelephones 1330, for example about −6 dBW.

The TX-only satellite 1310 may contain an on-board digital processor that can perform various functions, such as feeder-link channelization, filtering, beam routing and/or digital beam forming. Such functions have already been implemented in the Thuraya satellite that is currently providing service in the Middle East, and are well known to those having skill in the art. These functions therefore need not be described in further detail herein.

Referring again to FIG. 13, in some embodiments of the present invention, each receive antenna 1340*a*-1340*d* of each RX-only satellite 1320*a*, 1320*b* receives Left-Hand Circular Polarization (LHCP) energy and Right-Hand Circular Polarization (RHCP) energy. This may be received, since the radiotelephone 1330 may radiate linearly polarized energy, which contains half of its energy in LHCP and the remaining half in RHCP.

In some embodiments, each RX-only satellite 1320a, 1320b may contain up to four digital processors. In each satellite 1320a or 1320b, a first digital processor may be configured to operate on the aggregate signal received by the first antenna, for example antenna 1340a or 1340c, in LHCP, and perform the functions of signal channelization, filtering, beam forming and/or routing of signals to the feeder link. A second processor may be configured to perform the identical functions as the first, but on the RHCP signal received by the first antenna, such as antenna 1340a or 1340c. The remaining two processors may be configured to repeat these functions on the RHCP and LHCP signals of the second RX-only antenna, such as antenna 1340b or 1340d. All eight sets of received signals, from both RX-only satellites 1320a and 1320b, may be sent via one or more feeder links to one or more gateways for combining, as will now be described.

Figure 14:
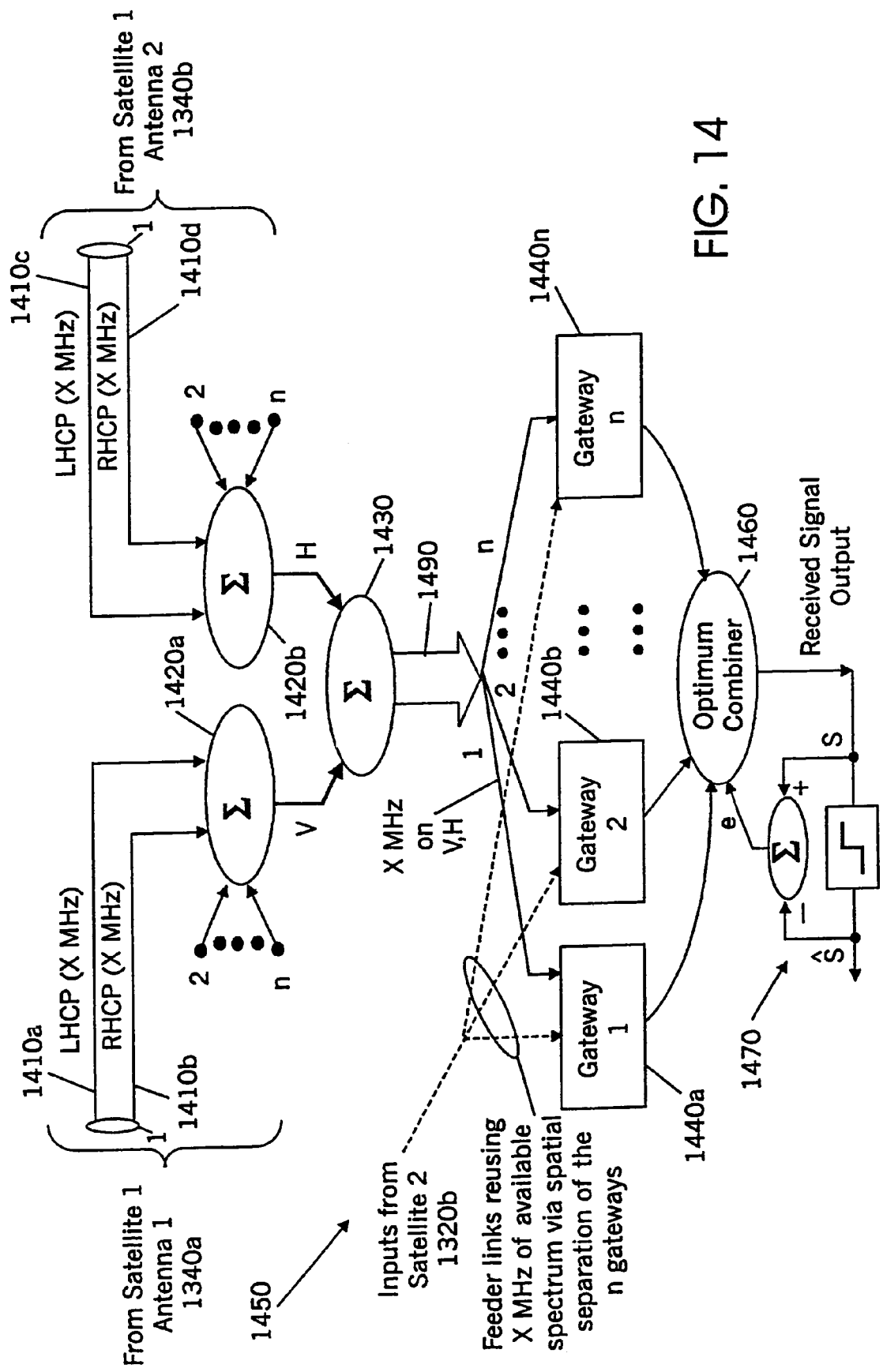
FIG. 14 is a block diagram of architectures for space-based networks according to embodiments of the present invention.

FIG. 14 is a block diagram of portions of the space-based network that illustrates how the signals from the RX-only satellite 1 1320a and RX-only satellite 2 1320b may be combined according to some embodiments of the present invention. Embodiments of FIG. 14 assume that the available feeder link bandwidth, from an RX-only satellite 1320a, 1320b to a gateway is X MHz, but that Y MHz is desired to transport the signals to the gateway, where Y is greater than X.

As shown in FIG. 14, a first X MHz of LHCP signal spectrum 1410a, received from RX-only satellite 1, antenna 1 1340a via the first processor, and a first corresponding X MHz of RHCP signal spectrum 1410b also received by RX-only satellite 1, antenna 1 1340a via the second processor, are mapped into in-phase (I) and quadrature (Q) dimensions of a first carrier. In other embodiments, the X MHz of signal spectrum that is mapped into the I and Q dimensions of the carrier need not be an RHCP signal received by satellite 1, antenna 1. Instead, it may be a corresponding X MHz of signal spectrum (LHCP or RHCP) from satellite 1, antenna 2 1340b. In some embodiments, any appropriate mapping of signals from the RX-only satellite antennas 1340a-1340b may be used, for example, by utilizing as many orthogonal polarizations and/or dimensions as possible, over the same available feeder bandwidth, so as to reduce or minimize the number of gateways or diversity sites that are used on the ground to transport the desired signals for processing thereof.

Returning again to FIG. 14, the X MHz bandwidth quadrature carrier may be transported to a first gateway 1440a over the X MHz of available feeder link bandwidth using a vertically (V) polarized orientation. Concurrently, a first X MHz of LHCP signal spectrum 1410c from RX-only satellite 1, antenna 2 1340b via the third processor, and a first RHCP signal spectrum 1410d from RX-only satellite 1, antenna 2 1340b via the fourth processor, are mapped onto the I and Q dimensions of a second carrier, at the same frequency as the first carrier, and are concurrently transported to the first gateway 1440a over the X MHz of available feeder link bandwidth using a horizontally (H) polarized orientation. The transmission medium is indicated schematically by summing node 1430 to indicate a concurrence of the horizontally and vertically polarized signals in the transmission medium.

This mapping onto X MHz bandwidth carriers in the I and Q dimensions may be repeated up to n times, as shown in FIG. 14 by the summing nodes 1420a, 1420b, in order to transmit the entire signal bandwidth received by the RX-only satellite 1320a corresponding to all satellite cells of each polarization (LHCP and RHCP) of each antenna. Accordingly, the processors and summing nodes 1420a, 1420b, along with other conventional components such as frequency translators, phase shifters, and/or filters, may comprise a feeder link signal generator according to some embodiments of the invention, which is configured to combine signals that are received by the first and second receive only antennas 1340a, 1340b into the feeder link signal 1490 that is transmitted on at least one carrier in a plurality of orthogonal dimensions.

Still referring to FIG. 14, similar operations may take place with respect to the second RX-only satellite 1320b. This mapping only is shown generally in FIG. 14 at 1450, for the sake of clarity. A plurality of gateways 1440a-1440n may be provided to spatially reuse the same available feeder link spectrum, up to n times in FIG. 14, and thus transport all the satellite receive signals to the ground, for demodulation and combining. Thus, the gateways 1440a-1440n can function as frequency reuse sites, as well as providing for diversity combining according to some embodiments of the present invention, as will be described below. It will be understood that if Y is less than or equal to X, only one gateway location 1440 may need to be used. Moreover, it also will be understood that other polarization schemes may be used at the various stages of FIG. 14, instead of the LHCP/RHCP and/or V/H polarization.

Demodulation and combining of the received signals for each user, according to some embodiments of the present invention, now will be described. In particular, in some embodiments, a given user signal will reach the ground via the plurality of polarizations (LHCP and RHCP) of each satellite antenna, via the plurality of satellite antennas 1340a-1340d of each RX-only satellite 1320a, 1320b, and via the plurality of RX-only satellites 1320a, 1320b. Furthermore, a plurality of satellite beams (cells) of each polarization, of each antenna, and of each RX-only satellite, may be contributing a desired signal component relative to the given user, particularly when the user is geographically close to the intersection of two or more of the satellite beams. Thus, embodiments of demodulation and combining may include processing of multiple signal components that are received by the various RX-only satellite antennas 1340a-1340d from a given radiotelephone 1330, in order to reconstruct the wireless communications from the radiotelephone.

In one example, up to three cells may be receiving useful signal contributions in a seven-cell frequency reuse plan. Moreover, in embodiments of FIGS. 13 and 14, there are two polarizations per cell, two antennas per satellite, and a total of two RX-only satellites. Thus, there may be 3×2×2×2 or 24 signal components per user that may be combined in some embodiments. In some embodiments, each of the plurality of signal components may be weighted in accordance with, for example, a least mean squared error performance index, and then summed, for example, in a combiner such as an optimum combiner 1460, to yield the received signal output S, shown in FIG. 14. A receiver decision stage 1470 then may be used to generate symbol estimates $\hat{S}$.

Finally, as was described above, in transporting a plurality of X MHz signal segments to the ground, each gateway site 1440a-1440n may also receive interference between the I and Q dimensions (also referred to as cross-rail interference) and/or cross-polarization interference between the vertical and horizontal polarizations, for example due to the non-ideal passband characteristics of the channel and/or the system.

In order to reduce or minimize these interferences, some known symbols may be transmitted over at least some of the orthogonal dimensions that were described above, to enable an adaptive receiver at a gateway site, to compensate at least in part for any such effect. In other embodiments, precompensation may be performed for the channel and/or system non-ideal passband characteristics at the satellite, prior to transmission over a feeder link. When using precompensation, error information may be sent back to the satellite from a processing gateway site.

In still other embodiments, the overhead of the known symbols, as was described above, may be avoided by relying on the decisions of the receiver. However, the reliability of the receiver's demodulation process may be increased by transporting the known symbols. Moreover, the overhead due to a known symbol sequence can be small, since the feeder link channel generally is quasi-static.

Figure 15:
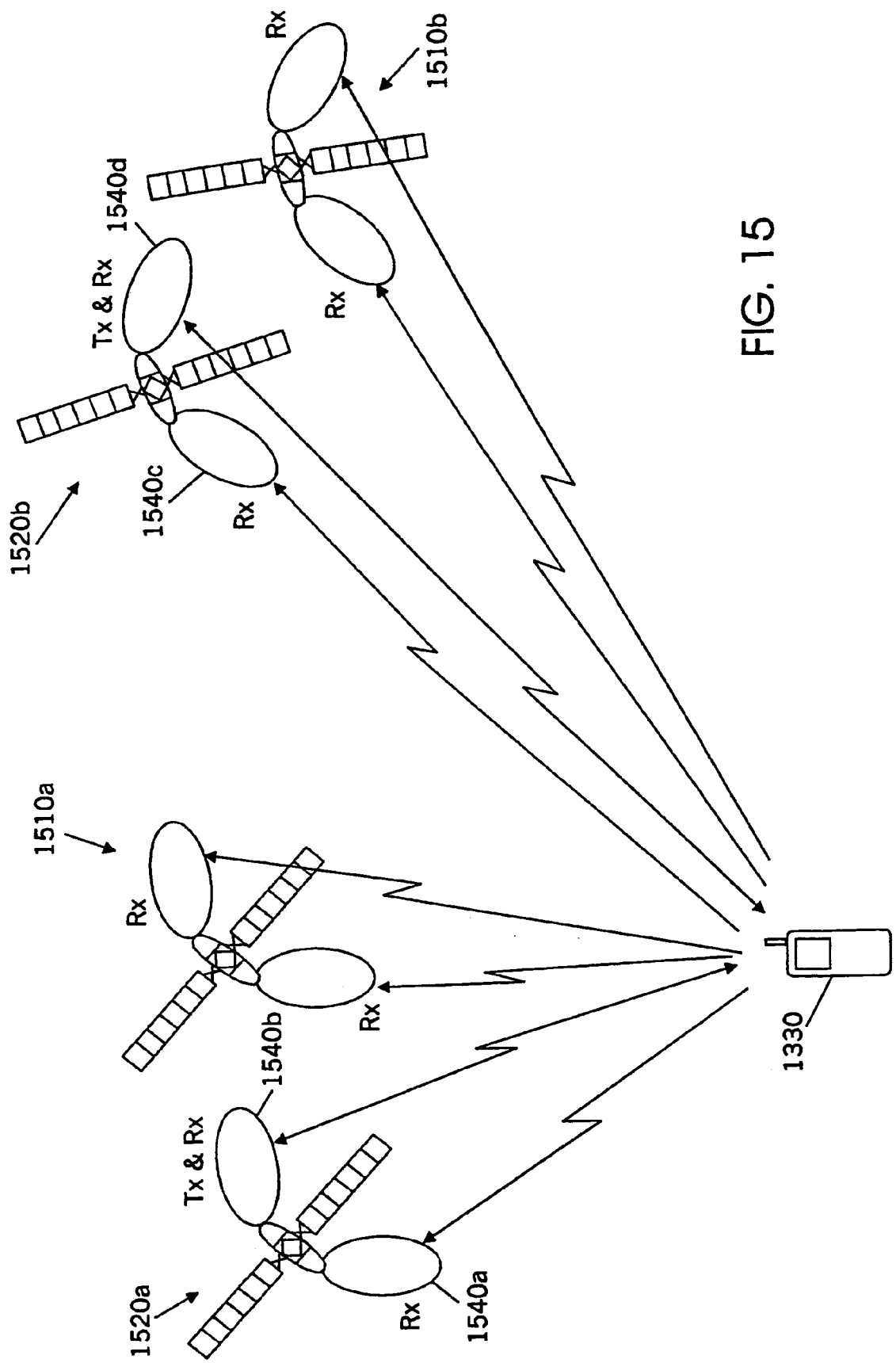
FIG. 15 schematically illustrates architectures for space-based networks according to other embodiments of the present invention.

FIG. 15 conceptually illustrates space-based network architectures according to other embodiments of the present invention. As shown in FIG. 15, these embodiments of the present invention include at least one receive-only satellite and at least one transmit and receive satellite. In particular, in some embodiments, a first receive-only satellite 1510a and a first transmit and receive satellite 1520a are co-located, for example at orbital slot 101° W. A second receive-only satellite 1510b and a second transmit and receive satellite 1520b also are co-located, for example at orbital slot 107.30° W.

Moreover, in still other embodiments of the invention, as also illustrated in FIG. 15, the transmit and receive satellites 1520a, 1520b can each include a respective first antenna 1540a, 1540c that is configured as a receive-only antenna, and a respective second antenna 1540b, 1540d that is configured to perform both transmit and receive functions. In still other embodiments of the invention, the second antenna 1540b, 1540d may be configured to perform transmit-only functions. In yet other embodiments, the first antenna 1540a, 1540c also may be configured to perform transmit and receive functions. In all embodiments, the antennas may be of same and/or different sizes.

Embodiments of FIG. 15 also can be used to obtain a relatively high return link (uplink) margin. For example, a comparison will be made relative to the Thuraya satellite. It will now be shown that a return link margin of approximately 13 dB higher may be obtained using space-based architectures according to some embodiments of the present invention.

In particular, assuming a single satellite with a single 24 meter diameter antenna, about 4 dB of additional margin may practically be obtained relative to the Thuraya 12 meter antenna. However, as shown in FIG. 15, if the satellite 1520a has two receive antennas 1540a, 1540b, the return link margin may be increased by an additional 3 dB, for a total of 7 dB over Thuraya, assuming that both antennas 1540a, 1540b on the satellite 1520a are of the same size and that combining of their outputs is performed. Thus, using only a single satellite 1520a of FIG. 15, with one dual purpose 24 meter transmit and receive antenna 1540b, and one receive-only 24 meter antenna 1540a, embodiments of the present invention can obtain 7 dB more return link margin than may be obtained in the Thuraya system.

The addition of the first receive-only satellite 1510a can add 3 dB more to the above link margin, since it includes two additional 24 meter receive-only L band antennas. Finally, satellites 1520b and 1510b can add 3 dB more to the above, for a total of 13 dB over and above that which may be obtained with Thuraya without even having considered diversity gains.

As was described above in connection with FIG. 14, each satellite receive antenna may be assumed to be receiving both RHCP and LHCP. The polarizations may be combined in a manner similar to that described in FIG. 14.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A space-based network for a satellite radiotelephone system comprising:
at least one receive-only satellite that is configured to receive uplink wireless communications directly from a radiotelephone over a return service link, but not to transmit downlink wireless communications directly to the radiotelephone over a forward service link, and not to transmit or receive wireless communications to/from another satellite over a satellite crosslink; and
at least one transmit and receive satellite that is configured to transmit downlink wireless communications directly to the radiotelephone over a forward service link and to receive the uplink wireless communications directly from the radiotelephone over a return service link and not to transmit or receive wireless communications to/from another satellite over a satellite crosslink, such that the at least one receive-only satellite increases a link margin of the uplink wireless communications from the radiotelephone over that which is provided by the at least one transmit and receive satellite by increasing an effective return link antenna aperture of the received uplink wireless communications, but does not impact a link margin of the downlink wireless communications to the radiotelephone over that which is provided by the at least one transmit and receive satellite.

2. A space-based network according to claim 1 wherein the at least one receive-only satellite consists of two receive-only satellites.

3. A space-based network according to claim 1 wherein the at least one receive-only satellite comprises first and second receive antennas.

4. A space-based network according to claim 2 wherein at least one of the two receive-only satellites comprises first and second receive antennas.

5. A space-based network according to claim 1 wherein the at least one receive-only satellite and/or the at least one transmit and receive satellite comprises at least one receive antenna that is about 24 meters in diameter.

6. A space-based network according to claim 1 wherein the at least one transmit and receive satellite consists of a single transmit and receive satellite that is substantially collocated in an orbital slot with a receive-only satellite.

7. A space-based network according to claim 2 wherein the at least one transmit and receive satellite consists of two transmit and receive satellites, a respective one of which is substantially collocated in an orbital slot with a respective receive-only satellite.

8. A space-based network according to claim 1 wherein the at least one transmit and receive satellite comprises a transmit antenna and a receive antenna.

9. A space-based network according to claim 1 wherein the at least one transmit and receive satellite comprises a transmit and receive antenna and a receive antenna.

10. A space-based network according to claim 7 wherein at least one of the two transmit and receive satellites comprises a transmit service link antenna and a receive service link antenna; wherein the transmit service link antenna is spaced apart from the receive service link antenna.

11. A space-based network according to claim 7 wherein at least one of the two transmit and receive satellites comprises an integrated service link antenna that comprises both transmit and receive functions.

12. A space-based network according to claim 1 further comprising:

at least one gateway that is configured to communicate with the at least one receive-only satellite and with the at least one transmit and receive satellite.

13. A space-based network according to claim 1 further comprising a feeder link signal generator that is configured to combine signals that are received by an antenna into a feeder link signal that is transmitted to a gateway in a plurality of substantially orthogonal dimensions and/or polarizations.

14. A space-based network according to claim 13 further comprising:
a gateway that is configured to receive the feeder link signal.

15. A space-based network according to claim 13 wherein a bandwidth of the feeder link signal is greater than or equal to an aggregate bandwidth of the signals that are received by the antenna.

16. A space-based network according to claim 13 further comprising:
a plurality of gateways, each of which is configured to receive a feeder link signal.

17. A space-based network according to claim 13 wherein the signals that are received by the antenna have an aggregate bandwidth that is greater than a bandwidth of the feeder link signal.

18. A space-based network according to claim 16 further comprising a combiner that is configured to combine a plurality of feeder link signals that are received at a respective plurality of gateways in order to reconstruct the uplink wireless communications from the radiotelephone.

19. A space-based network according to claim 1 further comprising:
an ancillary terrestrial network that is configured to wirelessly communicate with at least one radiotelephone using at least some service link frequencies of the space-based network.

20. A space-based network for a satellite radiotelephone system comprising:
a first receive-only satellite that is configured to receive uplink wireless communications directly from a radiotelephone over a return service link, but not to transmit downlink wireless communications directly to the radiotelephone over a forward service link and not to transmit or receive wireless communications to/from another satellite over a satellite crosslink;
a first transmit and receive satellite that is collocated with the first receive-only satellite in a first orbital slot and is configured to transmit downlink wireless communications directly to the radiotelephone over a forward service link and to receive the uplink wireless communications directly from the radiotelephone over a return service link and not to transmit or receive wireless communications to/from another satellite over a satellite crosslink;
a second receive-only satellite that is configured to receive the uplink wireless communications directly from the radiotelephone over a return service link, but not to transmit downlink wireless communications directly to the radiotelephone over a forward service link and not to transmit or receive wireless communications to/from another satellite over a satellite crosslink; and
a second transmit and receive satellite that is collocated with the second receive-only satellite in a second orbital slot and is configured to receive the uplink wireless communications directly from the radiotelephone over a return service link and not to transmit or receive wireless communications to/from another satellite over a satellite crosslink, such that the first and second receive-only satellites increase a link margin of the uplink wireless communications from the radiotelephone over that which is provided by the first and second transmit and receive satellites by increasing an effective return link antenna aperture of the received uplink wireless communications, but do not impact a link margin of the downlink wireless communications to the radiotelephone over that which is provided by the first and second transmit and receive satellites.

21. A space-based network according to claim 20 wherein at least one receive-only satellite comprises first and second service link receive antennas.

22. A space-based network according to claim 20 wherein at least one satellite comprises at least one receive antenna that is about 24 meters in diameter.

23. A space-based network according to claim 20 wherein a space-based portion of the space-based network consists of the first and second receive-only satellites and the first and second transmit and receive satellites.

24. A space-based network according to claim 20 wherein at least one of the first and second transmit and receive satellites comprises a transmit service link antenna and a receive service link antenna; wherein the transmit service link antenna is spaced apart from the receive service link antenna.

25. A space-based network according to claim 20 wherein at least one of the first and second transmit and receive satellites comprises an integrated service link antenna that comprises both transmit and receive functions.

26. A space-based network according to claim 20 further comprising:
at least one gateway what is configured to communicate with the first and second receive-only satellites and with the first and second transmit and receive satellites.

27. A space-based network according to claim 20 further comprising a feeder link signal generator that is configured to combine signals that are received by an antenna into a feeder link signal that is transmitted to a gateway in a plurality of substantially orthogonal dimensions and/or polarizations.

28. A space-based network according to claim 27 further comprising:
a gateway that is configured to receive the feeder link signal.

29. A space-based network according to claim 28 wherein a bandwidth of the feeder link signal is greater than or equal to an aggregate bandwidth of the signals that are received by the antenna.

30. A space-based network according to claim 27 further comprising:
a plurality of gateways, each of which is configured to receive a feeder link signal.

31. A space-based network according to claim 27 wherein the signals that are received by the antenna have an aggregate bandwidth that is greater than a bandwidth of the feeder link signal.

32. A space-based network according to claim 30 further comprising a combiner that is configured to combine a plurality of feeder link signals that are received at a respective plurality of gateways in order to reconstruct the uplink wireless communications from the radiotelephone.

33. A space-based network according to claim 20 further comprising:
an ancillary terrestrial network that is configured to wirelessly communicate with at least one radiotelephone using at least some service link frequencies of the space-based network.

34. A space-based network for a satellite radiotelephone system comprising:

a first receive-only satellite that is configured to receive uplink wireless communications directly from a radiotelephone over a return service link, but not to transmit downlink wireless communications directly to the radiotelephone over a forward service link and not to transmit or receive wireless communications to/from another satellite over a satellite crosslink;

a transmit and receive satellite that is collocated with the first receive-only satellite in a first orbital slot and is configured to transmit downlink wireless communications directly to the radiotelephone over a forward service link and to receive the uplink wireless communications from the radiotelephone directly over a return service link and not to transmit or receive wireless communications to/from another satellite over a satellite crosslink; and a second receive-only satellite that is located in a second orbital slot and is configured to receive the uplink wireless communications directly from the radiotelephone over a return service link, but not to transmit downlink wireless communications directly to the radiotelephone over a forward service link and not to transmit or receive wireless communications to/from another satellite over a satellite crosslink, such that the first and second receive-only satellites increase a link margin of the uplink wireless communications from the radiotelephone over that which is provided by the transmit and receive satellite by increasing an effective return link antenna aperture of the received uplink wireless communications, but do not impact a link margin of the downlink wireless communications to the radiotelephone over that which is provided by the transmit and receive satellite.

35. A space-based network according to claim 34 wherein at least one receive-only satellite comprises first and second receive antennas.

36. A space-based network according to claim 34 wherein at least one satellite comprises at least one receive antenna that is about 24 meters in diameter.

37. A space-based network according to claim 34 wherein a space-based portion of the space-based network consists of the first and second receive-only satellites and the transmit and receive satellite.

38. A space-based network according to claim 34 wherein the transmit and receive satellite comprises a transmit antenna and a receive antenna.

39. A space-based network according to claim 34 wherein the transmit and receive satellite comprises a transmit service link antenna and a receive service link antenna.

40. A space-based network according to claim 34 further comprising:
at least one gateway what is configured to communicate with the first and second receive-only satellites and the transmit and receive satellite.

41. A space-based network according to claim 34 further comprising a feeder link signal generator that is configured to combine signals that are received by an antenna into a feeder link signal that is transmitted to a gateway in a plurality of substantially orthogonal dimensions and/or polarizations.

42. A space-based network according to claim 41 further comprising:
a gateway that is configured to receive the feeder link signal.

43. A space-based network according to claim 41 wherein a bandwidth of the feeder link signal is greater than or equal to an aggregate bandwidth of the signals that are received by the antenna.

44. A space-based network according to claim 41 further comprising:
a plurality of gateways, each of which is configured to receive a feeder link signal.

45. A space-based network according to claim 41 wherein the signals that are received by the antenna have an aggregate bandwidth that is greater than a bandwidth of the feeder link signal.

46. A space-based network according to claim 44 further comprising a combiner that is configured to combine a plurality of feeder link signals that are received at a respective plurality of gateways in order to reconstruct the uplink wireless communications from the radiotelephone.

47. A space-based network according to claim 34 further comprising:
an ancillary terrestrial network that is configured to wirelessly communicate with at least one radiotelephone using at least some service link frequencies of the space-based network.

48. A space-based network according to claim 1, wherein at least one satellite is further configured to receive wireless communications from the radiotelephone over at least two antenna patterns.

49. A space-based network according to claim 48 further comprising:
a gateway that is configured to combine signals received over the at least two antenna patterns on a per user basis.

50. A space-based network according to claim 20, wherein at least one satellite is configured to receive wireless communications from the radiotelephone over at least two antenna patterns.

51. A space-based network according to claim 50 further comprising:
a gateway that is configured to combine signals received over the at least two antenna patterns on a per user basis.

52. A space-based network according to claim 34, wherein at least one satellite is configured to receive wireless communications from the radiotelephone over at least two antenna patterns.

53. A space-based network according to claim 52 further comprising:
a gateway that is configured to combine signals received over the at least two antenna patterns on a per user basis.

54. A space-based network comprising at least one satellite and at least one gateway; wherein the at least one gateway is configured to receive a plurality of feeder link signals from the at least one satellite over at least one feeder link via a plurality of substantially distinct dimensions and/or a plurality of substantially distinct spatial paths; at least one feeder link signal received at the at least one gateway containing interference that results from the plurality of substantially distinct dimensions and/or the plurality of substantially distinct spatial paths of the feeder link signals, and wherein the at least one gateway comprises an interference reducer configured to reduce the interference of the at least one feeder link signal by jointly processing the at least one feeder link signal and at least one other feeder link signal received by the at least one gateway from the at least one satellite over the at least one feeder link via the plurality of substantially distinct dimensions and/or the plurality of substantially distinct spatial paths.

55. A system according to claim 54 wherein the interference reducer reduces interference by processing information that is inserted by the at least one satellite in at least one dimension and/or spatial path.

56. A space-based network according to claim 1 wherein the at least one transmit and receive satellite comprises a transmit and receive antenna.

57. A space-based network according to claim 20 wherein at least one transmit and receive satellite comprises a transmit and receive antenna.

58. A space-based network according to claim 34 wherein the transmit and receive satellite comprises a transmit and receive antenna.

59. A method of providing wireless communications, the method comprising:
receiving uplink wireless communications using at least one receive-only satellite; wherein each one of the at least one receive-only satellite is configured to receive from a radiotelephone and not to transmit to the radiotelephone and not to transmit or receive wireless communications to/from another satellite over a satellite crosslink, and wherein receiving uplink wireless communications comprises receiving directly from the radiotelephone over at least one return service link;
transmitting downlink wireless communications using at least one transmit and receive satellite; wherein each one of the at least one transmit and receive satellite is configured to transmit to the radiotelephone and to receive from the radiotelephone and wherein transmitting downlink wireless communications comprises transmitting directly from the at least one transmit and receive satellite to the radiotelephone over at least one forward service link and does not comprise transmitting or receiving wireless communications directly to/from another satellite over a satellite crosslink; and
receiving the uplink wireless communications directly from the radiotelephone over at least one return service link using the at least one transmit and receive satellite
wherein the receiving uplink wireless communications using the at least one receive-only satellite increases a link margin of the uplink wireless communications from the radiotelephone over that which is provided by the receiving the uplink wireless communications using the at least one transmit and receive satellite by increasing an effective return link antenna aperture of the received uplink wireless communications, but does not impact a link margin associated with the transmitting downlink wireless communications to the radiotelephone over that which is provided by the transmitting downlink wireless communications using the at least one transmit and receive satellite.

60. A method according to claim 59, wherein the at least one receive-only satellite consists of two receive-only satellites.

61. A method according to claim 59, wherein the at least one receive-only satellite comprises first and second receive antennas.

62. A method according to claim 60, wherein at least one of the two receive-only satellites comprises first and second receive antennas.

63. A method according to claim 59, wherein at least one receive-only satellite and/or the at least one transmit and receive satellite comprises at least one receive antenna that is about 24 meters in diameter.

64. A method according to claim 59, wherein the at least one transmit and receive satellite consists of a single transmit and receive satellite that is substantially collocated in an orbital slot with a receive-only satellite.

65. A method according to claim 60, wherein the at least one transmit and receive satellite consists of two transmit and receive satellites, a respective one of which is substantially collocated in an orbital slot with a respective receive-only satellite.

66. A method according to claim 59, wherein the at least one transmit and receive satellite comprises a transmit antenna and a receive antenna.

67. A method according to claim 59, wherein the at least one transmit and receive satellite comprises a transmit and receive antenna and a receive antenna.

68. A method according to claim 65, wherein at least one of the two transmit and receive satellites comprises a transmit service link antenna and a receive service link antenna; wherein the transmit service link antenna is spaced apart from the receive service link antenna.

69. A method according to claim 65, wherein at least one of the two transmit and receive satellites comprises an integrated service link antenna that comprises both transmit and receive functions.

70. A method according to claim 59, further comprising:
communicating between at least one gateway and the at least one receive-only satellite and between the at least one gateway and the at least one transmit and receive satellite.

71. A method according to claim 59, further comprising:
combining signals that are received by an antenna into a feeder link signal that is transmitted to a gateway in a plurality of substantially orthogonal dimensions and/or polarizations.

72. A method according to claim 71, further comprising:
receiving at the gateway the feeder link signal.

73. A method according to claim 71, wherein a bandwidth of the feeder link signal is greater than or equal to an aggregate bandwidth of the signals that are received by the antenna.

74. A method according to claim 71, further comprising:
receiving at a plurality of gateways, each of which is configured to receive a feeder link signal.

75. A method according to claim 71, wherein the signals that are received by the antenna have an aggregate bandwidth that is greater than a bandwidth of the feeder link signal.

76. A method according to claim 74, further comprising:
combining a plurality of feeder link signals that are received at a respective plurality of gateways in order to reconstruct the uplink wireless communications from the radiotelephone.

77. A method according to claim 59, further comprising:
providing terrestrial communications by using service link frequencies of a space-based network.

78. A method of providing wireless communications, the method comprising:
receiving uplink wireless communications from a radiotelephone directly over a return service link using a receive-only satellite that is configured to receive from the radiotelephone and not to transmit to the radiotelephone and not to transmit or receive wireless communications to/from another satellite over a satellite crosslink; and
receiving the uplink wireless communications from the radiotelephone directly over a return service link using a transmit and receive satellite that is configured to transmit to the radiotelephone and to receive from the radiotelephone and not to transmit or receive wireless communications to/from another satellite over a satellite crosslink, such that the receiving uplink wireless communications using the receive-only satellite increases a link margin of the uplink wireless communications from the radiotelephone over that which is provided by receiving the uplink wireless communications using the transmit and receive satellite by increasing an effective return link antenna aperture of the received uplink wireless communications, but does not impact a link margin of the downlink wireless communications to the radiotelephone over that which is provided by the transmit and receive satellite.

* * * * *